US012328680B2

(12) United States Patent
Huang et al.

(10) Patent No.: US 12,328,680 B2
(45) Date of Patent: Jun. 10, 2025

(54) GROUP COMMON DCI BASED POWER CONTROL WITH PUCCH CARRIER SWITCH

(71) Applicant: QUALCOMM Incorporated, San Diego, CA (US)

(72) Inventors: Yi Huang, San Diego, CA (US); Mostafa Khoshnevisan, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 17/651,224

(22) Filed: Feb. 15, 2022

(65) Prior Publication Data
US 2023/0038444 A1 Feb. 9, 2023

Related U.S. Application Data

(60) Provisional application No. 63/232,916, filed on Aug. 13, 2021, provisional application No. 63/227,182, filed on Jul. 29, 2021.

(51) Int. Cl.
*H04W 52/32* (2009.01)
*H04W 36/08* (2009.01)
(Continued)

(52) U.S. Cl.
CPC ....... *H04W 52/325* (2013.01); *H04W 52/146* (2013.01); *H04W 72/21* (2023.01); *H04W 72/23* (2023.01)

(58) Field of Classification Search
CPC ... H04W 52/04; H04W 52/14; H04W 52/146; H04W 36/08; H04W 52/32;
(Continued)

(56) References Cited

U.S. PATENT DOCUMENTS 9,179,416 B2 * 11/2015 Suzuki ................. H04W 52/18
9,414,335 B2 * 8/2016 Moon .................. H04W 52/54
(Continued)

FOREIGN PATENT DOCUMENTS

EP       3941126 A1    1/2022
WO  WO-2020183723 A1 *  9/2020  ........ H04W 72/0446

OTHER PUBLICATIONS

CATT: "Remaining Issues on PUCCH on SCell for Rel-13 CA", 3GPP TSG RAN WG1 Meeting #81, R1-152564, 3rd Generation Partnership Project, Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015, XP050971631, 2 Pages, Section 2.2.
(Continued)

*Primary Examiner* — Quochien B Vuong
(74) *Attorney, Agent, or Firm* — Procopio, Cory, Hargreaves & Savitch LLP

(57) ABSTRACT

Methods, apparatuses, and computer-readable medium are provided for enabling DCI based power control for PUCCH. An example method includes receiving, from a network entity, a DCI comprising a group TPC message, the DCI indicating multiple TPCs including one or more TPCs associated with one or more secondary cells and a primary cell for the UE and one or more other UEs. The example method further includes identifying a TPC to be applied to a target secondary cell or a target primary cell from the one or more TPCs. The example method further includes transmitting, to the base station, a PUCCH on the target secondary cell or the target primary cell based on the identified TPC from the one or more TPCs.

23 Claims, 18 Drawing Sheets

(51) Int. Cl.
*H04W 52/14* (2009.01)
*H04W 72/04* (2023.01)
*H04W 72/21* (2023.01)
*H04W 72/23* (2023.01)

(58) Field of Classification Search
CPC ... H04W 52/325; H04W 52/54; H04W 72/02; H04W 72/04; H04W 72/21; H04W 72/23
See application file for complete search history.

(56) References Cited

U.S. PATENT DOCUMENTS

| | | | |
|---|---|---|---|
| 9,629,095 B2* | 4/2017 | Dinan | H04W 52/325 |
| 10,945,216 B2* | 3/2021 | MolavianJazi | H04W 52/146 |
| 2016/0286495 A1 | 9/2016 | Dinan | |
| 2021/0084596 A1 | 3/2021 | Lee et al. | |
| 2022/0330163 A1* | 10/2022 | Liu | H04W 52/146 |

OTHER PUBLICATIONS

International Search Report and Written Opinion—PCT/US2022/035571—ISA/EPO—Oct. 18, 2022.

* cited by examiner

GROUP COMMON DCI BASED POWER CONTROL WITH PUCCH CARRIER SWITCH

CROSS REFERENCE TO RELATED APPLICATION(S)

This application claims the benefit of and priority to U.S. Provisional Application Ser. Nos. 63/227,182 and 63/232,916, both entitled "GROUP COMMON DCI BASED POWER CONTROL WITH PUCCH CARRIER SWITCH" and filed respectively on Jul. 29, 2021 and Aug. 13, 2021, each of which is expressly incorporated by reference herein in its entirety.

TECHNICAL FIELD

The present disclosure relates generally to communication systems, and more particularly, to wireless communication systems with downlink control information (DCI), transmission power control (TPC), and physical uplink control channel (PUCCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a network entity, a DCI comprising a group TPC message, the DCI indicating multiple TPCs including one or more TPCs associated with one or more secondary cells and a primary cell for the UE and one or more other UEs. The memory and the at least one processor coupled to the memory may be further configured to identify a TPC to be applied to a target secondary cell or a target primary cell from the one or more TPCs. The memory and the at least one processor coupled to the memory may be further configured to transmit, to the network entity, a PUCCH on the target secondary cell or the target primary cell based on an identified TPC from the one or more TPCs.

In an aspect of the disclosure, a method, a computer-readable medium, and an apparatus at a network entity are provided. The apparatus may include a memory and at least one processor coupled to the memory. The memory and the at least one processor coupled to the memory may be configured to transmit a DCI comprising a group TPC message, the DCI indicating multiple TPCs including one or more TPCs associated with one or more secondary cells and a primary cell for the UE and one or more other UEs. The memory and the at least one processor coupled to the memory may be further configured to receive a PUCCH on the target secondary cell or the target primary cell based on an identified TPC from the one or more TPCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
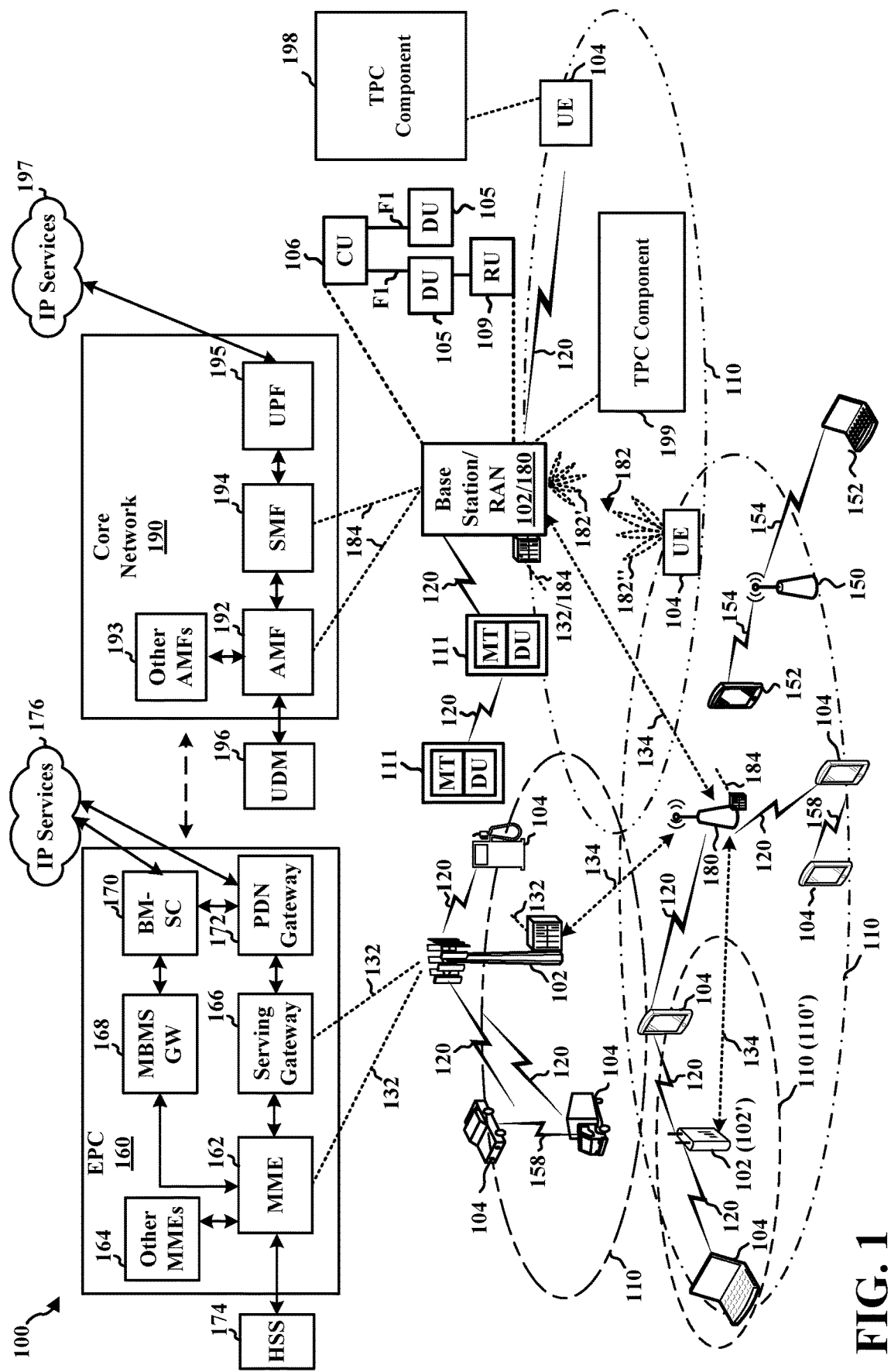
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a TPC component 198. In some aspects, the TPC component 198 may be configured to receive, from a network entity, a DCI comprising a group TPC message, the DCI indicating multiple TPCs including one or more TPCs associated with one or more secondary cells and a primary cell for the UE and one or more other UEs. In some aspects, the TPC component 198 may be further configured to identify a TPC to be applied to a target secondary cell or a target primary cell from the one or more TPCs. In some aspects, the TPC component 198 may be further configured to transmit, to the network entity, a PUCCH on the target secondary cell or the target primary cell based on the identified TPC from the one or more TPCs. The network entity may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

In certain aspects, the base station 180 may include a TPC component 199. In some aspects, the TPC component 199 may be configured to transmit a DCI comprising a group TPC message, the DCI indicating multiple TPCs including one or more TPCs associated with one or more secondary cells and a primary cell for the UE and one or more other UEs. In some aspects, the TPC component 199 may be further configured to receive a PUCCH on the target secondary cell or the target primary cell based on an identified TPC from the one or more TPCs.

Although the following description may be focused on 5G NR, the concepts described herein may be applicable to other similar areas, such as LTE, LTE-A, CDMA, GSM, and other wireless technologies.

Figure 2:
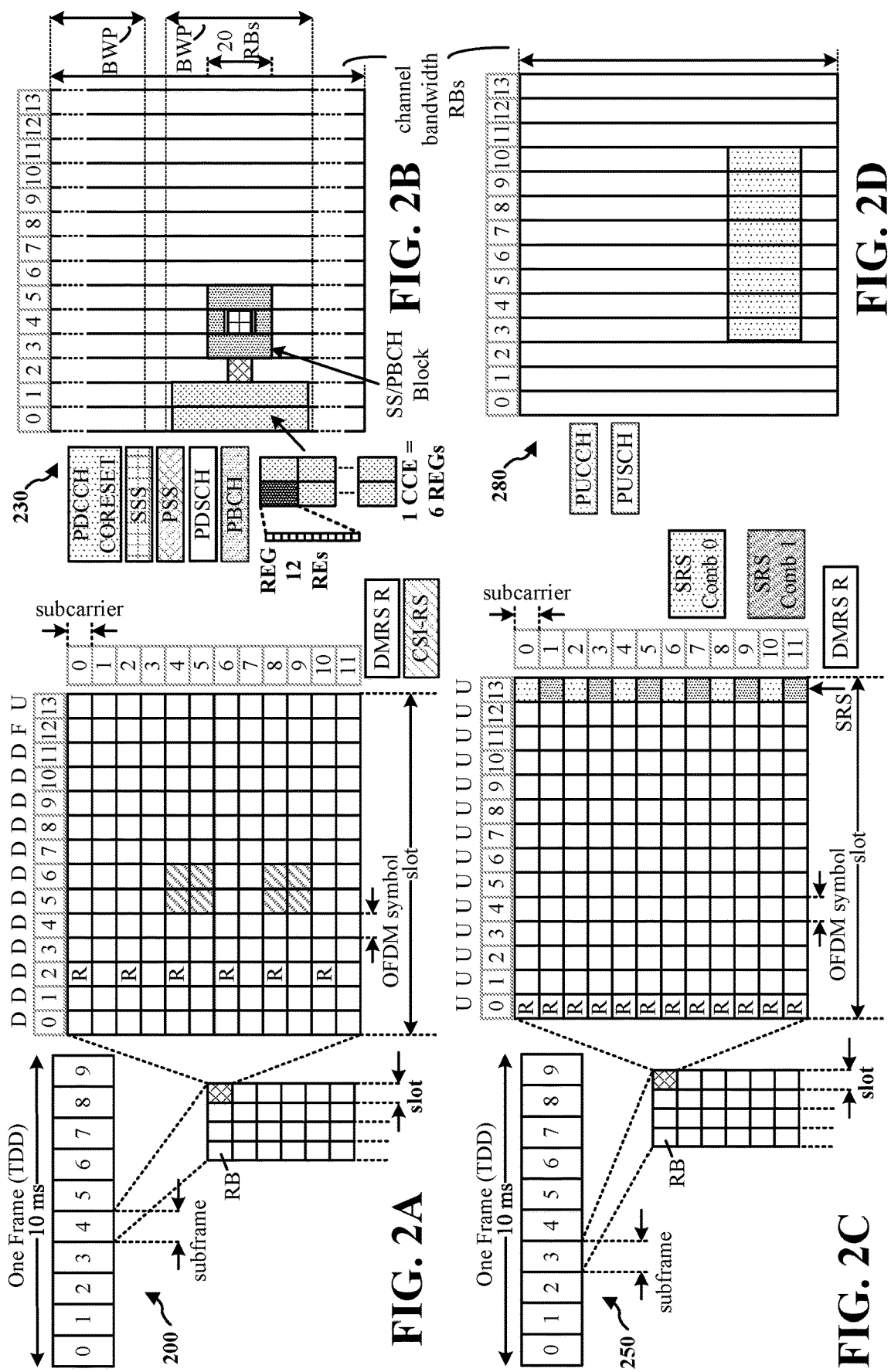
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
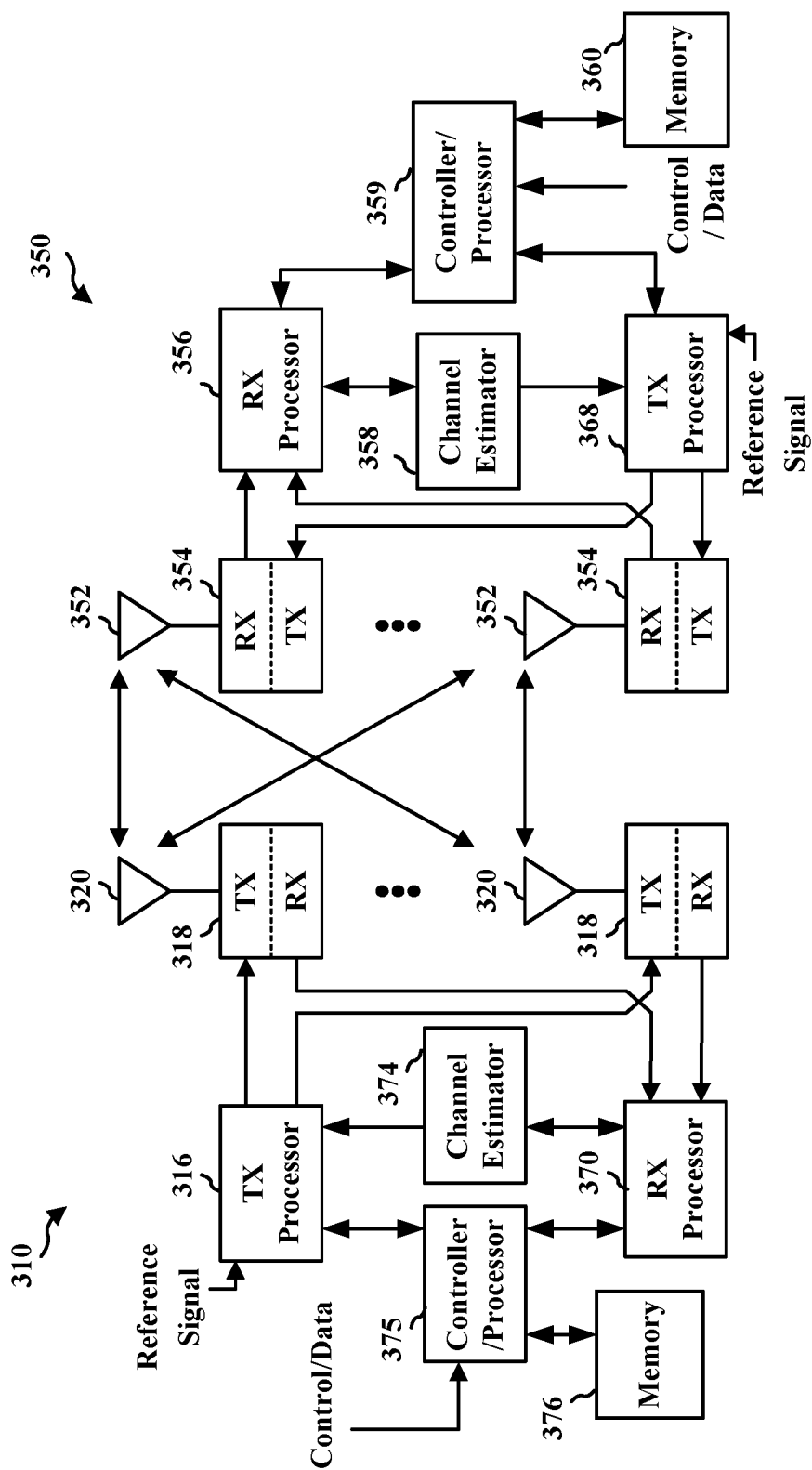
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TPC component 198 of FIG. 1.

At least one of the TX processor 316, the RX processor 370, and the controller/processor 375 may be configured to perform aspects in connection with the TPC component 199 of FIG. 1.

Figure 4:
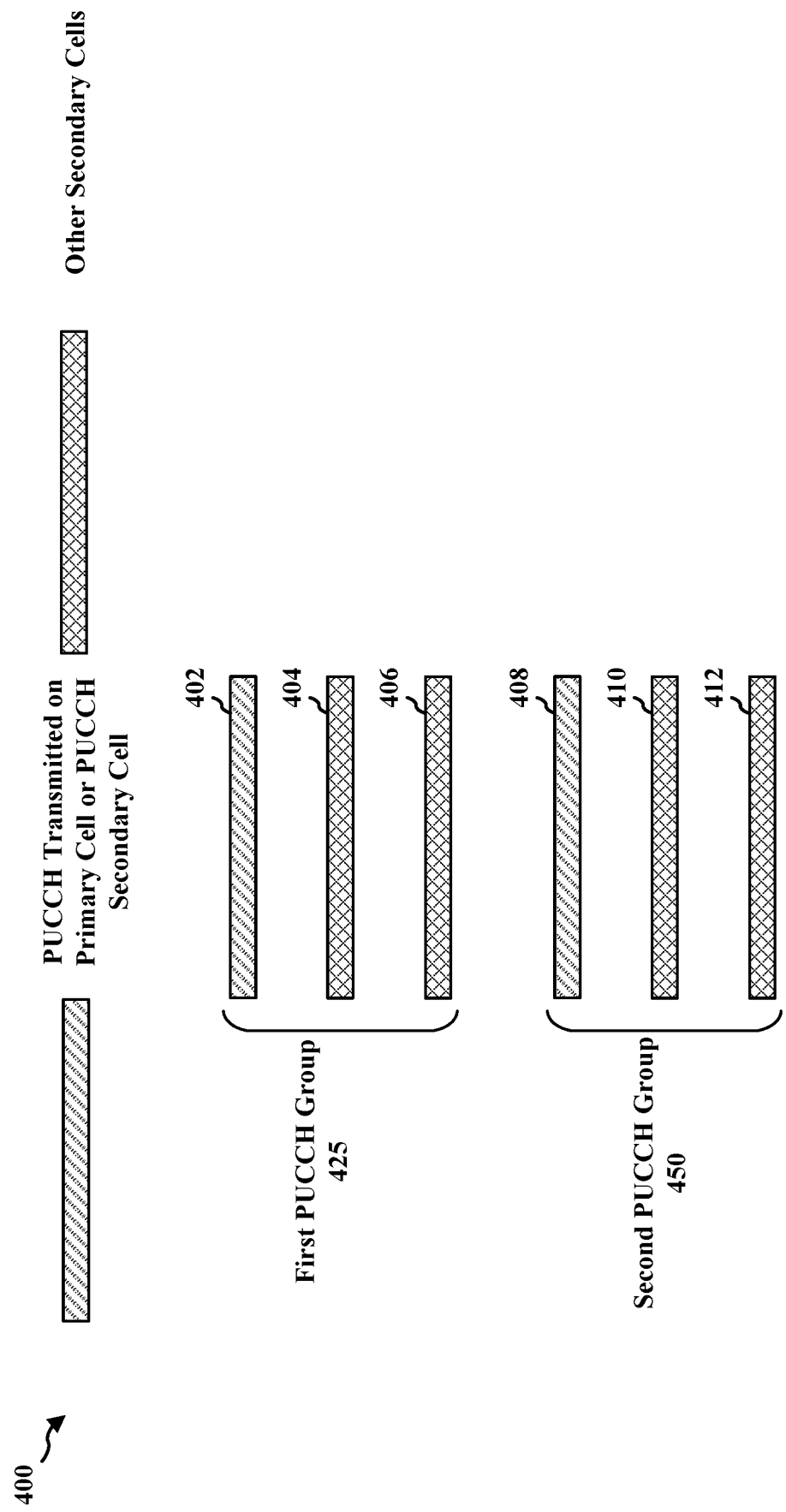
FIG. 4 is a diagram illustrating an example of PUCCH groups.

Carrier aggregation is a feature in some wireless communication systems that may combine multiple frequency bands to offer additional bandwidth, which may result in faster data speeds. In some wireless communication systems that provide uplink carrier aggregation, a PUCCH may be transmitted on a primary cell (Pcell) or a PUCCH secondary cell (PUCCH-SCell) in a PUCCH group. FIG. 4 is a diagram 400 illustrating examples of PUCCH groups. As illustrated in FIG. 4, a PUCCH in a first PUCCH group 425 may be transmitted on a primary cell 402. The first PUCCH group 425 may further include a secondary cell 404 and a secondary cell 406 that are not for transmitting PUCCH, e.g., different than the PUCCH-SCell. A PUCCH in the second PUCCH group 450 may be transmitted on a secondary cell 408, the PUCCH-SCell. The second PUCCH group 450 may further include a secondary cell 410 and a secondary cell 412 that are not for transmitting PUCCH.

Figure 5:
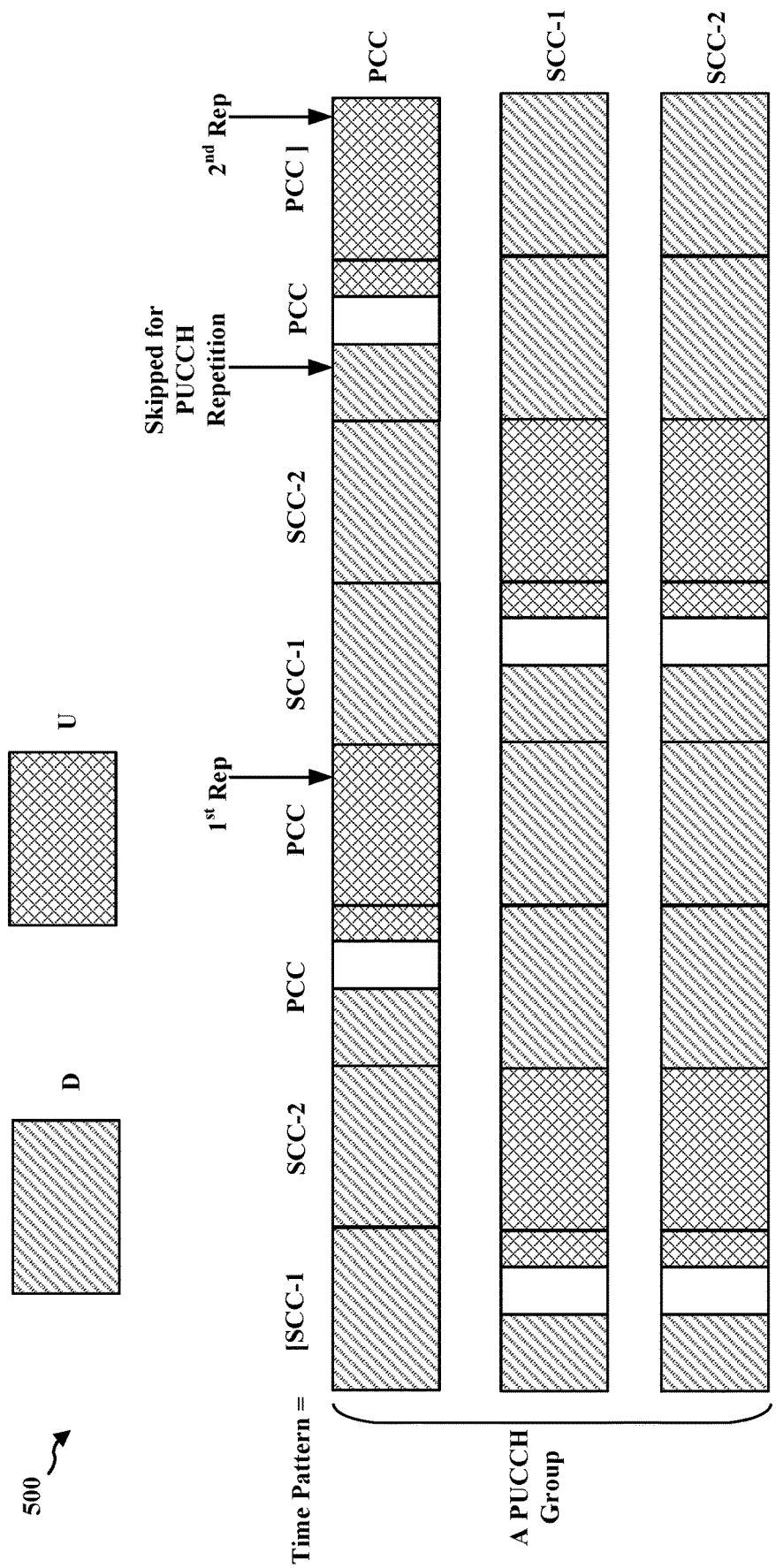
FIG. 5 is a diagram illustrating example PUCCH switch and repetitions.

In some other wireless communication systems, PUCCH switching among different component carriers (CCs) may be allowed. For example, a base station may indicate which CC the UE is to use to transmit a PUCCH in a slot. The base station may transmit the indication in a field in downlink control information (DCI) (which may be a dynamic indication) and/or a radio resource control (RRC) configured time pattern (which may be a semi-static indication). A dynamic indication in DCI may be used for acknowledgment/negative acknowledgment (A/N) for dynamic scheduled PDSCH. A RRC configured time pattern may be used for A/N for semi-persistent scheduling (SPS) PDSCH. FIG. 5 is a diagram 500 illustrating example PUCCH switch and repetitions. As illustrated in FIG. 5, PUCCH may be repeated on primary cells and each slot may include one PUCCH repetition. For example, for a PUCCH with two repetitions and each repetition with a duration of 14 OFDM symbols, a base station may indicate a starting slot for a first repetition. For subsequent repetitions, the UE may sweep subsequent uplink slots on a primary component carrier (PCC), and transmit the PUCCH repetition on the slots having enough uplink OFDM symbols to accommodate one PUCCH repetition.

In some wireless communication systems, a DCI, such as a group-common DCI, may be used for the transmission of TPC commands for PUCCH and PUSCH. A group-common DCI may be a DCI configured for a group of UEs. For example, a DCI of DCI format 2_2 may be used for the transmission of TPC commands for PUCCH and PUSCH. Information, such as block based information may be transmitted by means of the DCI format 2_2 with cyclic redundancy check (CRC) scrambled by a TPC parameter associated with a PUSCH or a PUCCH and a radio network temporary identifier (RNTI), such as a TPC-PUSCH-RNTI parameter or a TPC-PUCCH-RNTI. Example information may include: block number 1, block number 2, ..., block number N.

TPC parameters may associated with PUSCH or PUCCH, such as TPC-PUSCH or TPC-PUCCH, may be provided by higher layers and may be used for determining the index to the block number for an uplink of a cell. A closed loop indicator field and a TPC command field may be defined for each block. Regarding the closed loop indicator, for DCI format 2_2 with TPC-PUSCH-RNTI, the closed loop indicator may be 0 bit if the UE is not configured with a higher layer parameter representing a PUCCH power control adjustment state (e.g., which parameter may be referred to as "twoPUSCH-PC-AdjustmentStates"), in which case UE assumes each block in the DCI format 2_2 is of 2 bits; 1 bit otherwise, in which case UE assumes each block in the DCI format 2_2 is of 3 bits.

As one example, the TPC command may be 2 bits. The number of information bits in format 22 may be equal to or less than the payload size of format 10 (used for the scheduling of PDSCH in one downlink cell) monitored in common search space in the same serving cell. If the number of information bits in format 2_2 is less than the payload size of format 1_0 monitored in common search space in the same serving cell, zeros may be appended to format 2_2 until the payload size equals that of format 1_0 monitored in common search space in the same serving cell.

Figure 6:
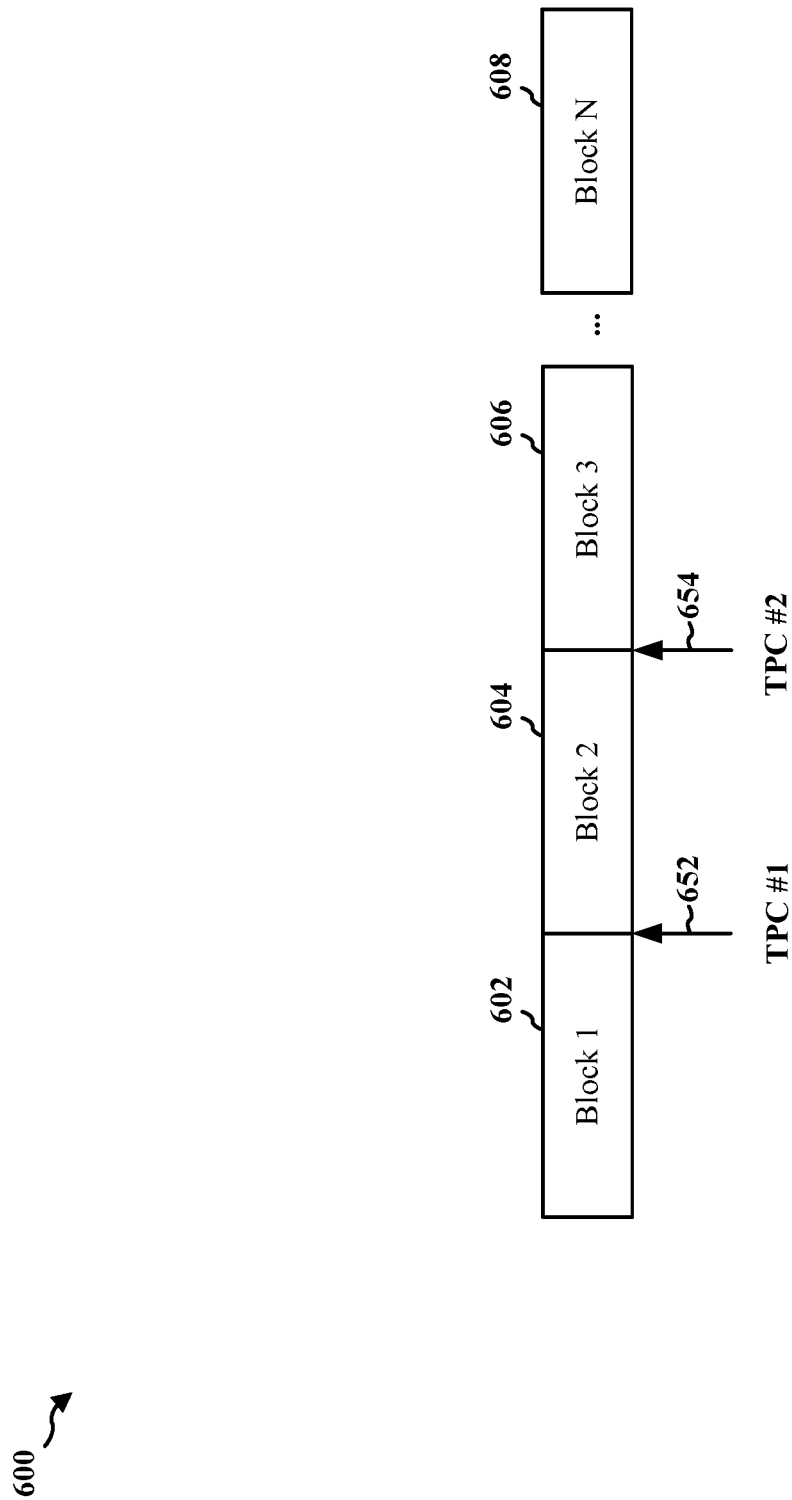
FIG. 6 is a diagram illustrating example DCI.

FIG. 6 is a diagram illustrating example DCI 2_2 600. As illustrated in FIG. 6, a first block 602 (e.g., block 1 in FIG. 6) may be associated with a first TPC 652 (e.g., TPC 1 in FIG. 6). For example, the first TPC 652 may be a TPC parameter associated with an index primary cell. A second block 604 (e.g., block 2 in FIG. 6) may be associated with a second TPC 654 (e.g., TPC 2 in FIG. 6). For example, the second TPC 654 may be a TPC parameter associated with a PUCCH-SCell. Additional blocks, such as block 606 (e.g., block 3 in FIG. 6) and block 608 (e.g., block 4 in FIG. 6), may also be represented in the DCI 2_2.

In some wireless communication systems, an information element (IE) structure may be used for configuring a UE to extract TPC commands for PUCCH from a group-TPC message in DCI, such as DCI 2_2. For example, the IE structure may be referred to as a "PUCCH-TPC-Command-Config". The IE structure may include a first index, such as a tpc-IndexPCell, for determining the position of the first bit of TPC command (applicable to a special cell (SpCell)) inside the DCI format 2-2 payload. The IE structure may further include a second index, such as a tpc-IndexPUCCH-SCell, for determining the position of the first bit of TPC command (applicable to the PUCCH secondary cell) inside the DCI format 2-2 payload. The IE may be configured via radio resource control (RRC).

Figure 7:
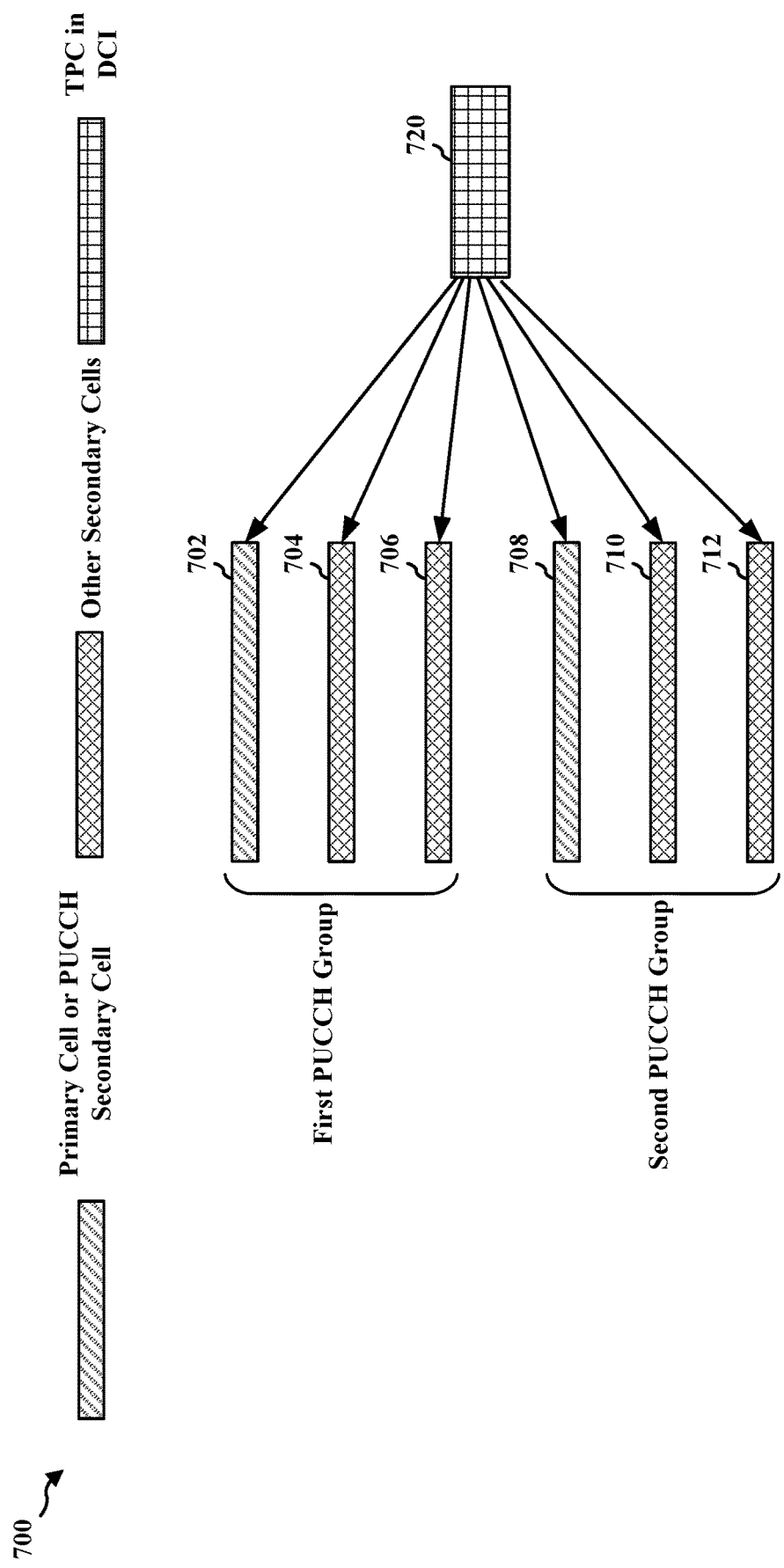
FIG. 7 is a diagram illustrating example TPC applying to primary and secondary cells.

Example aspects provided herein enable a DCI, such as a group-common DCI format 2_2, to indicate TPC for PUCCH transmission on secondary cells that may not be a PUCCH secondary cell. For example, FIG. 7 is a diagram 700 illustrating example TPC applying to primary and secondary cells enabled by some example aspects provided herein. As illustrated in FIG. 7, a TPC in DCI 720 may be applicable to a primary cell 702 in a first PUCCH group, a PUCCH secondary cell 708 in a second PUCCH group, and other secondary cells in the first and second PUCCH groups such as a secondary cell 704, a secondary cell 706, a secondary cell 710, and a secondary cell 712. The UE may switch PUCCH transmission on the secondary cells that may not be PUCCH cells and may still apply a same TPC indicated by a DCI, such as a group-common DCI 2_2.

Figure 8:
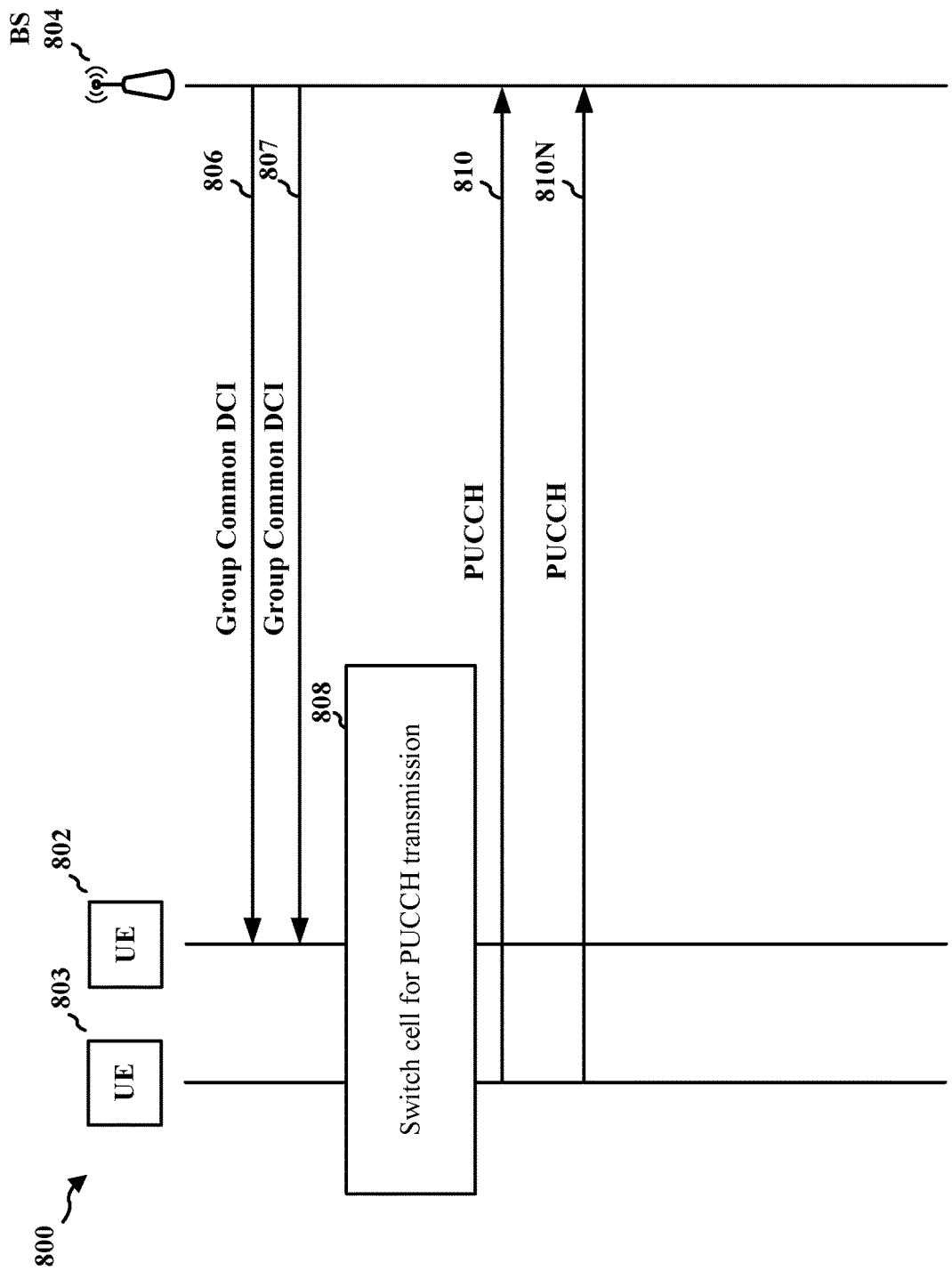
FIG. 8 is a diagram illustrating example communication flow between a UE and a base station.

FIG. 8 is a diagram illustrating example communication flow 800 between a UE and a base station. As illustrated in FIG. 8, the base station 804 may transmit a group-common DCI 806 to the UE 802. The group-common DCI 806 may indicate TPC for secondary cells that may not be PUCCH secondary cells. The UE 802 may switch cells for PUCCH transmission such that the UE 802 may use secondary cells that may not be PUCCH secondary cells at 808. The UE 802 may accordingly transmit PUCCH 810 to the base station 804. The format of the group-common DCI 806 may be further described in connection with FIGS. 9-11. In some aspects, the UE 802 may further transmit one or more repetitions of PUCCH 810 (e.g., PUCCH 810N) to the base station 804.

Figure 9:
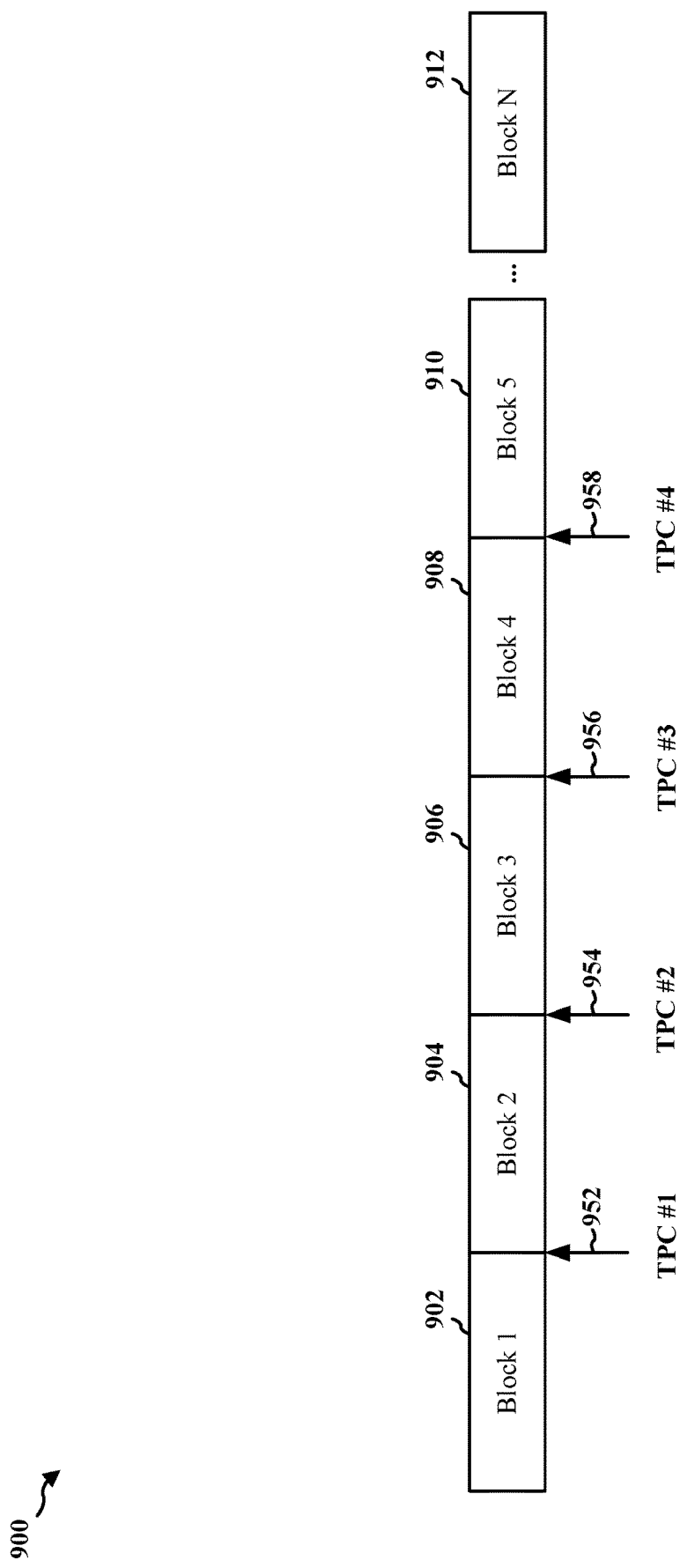
FIG. 9 is a diagram illustrating example DCI.

In some aspects, the group-common DCI 806 may be a DCI format 2_2 that indicates TPC for multiple secondary cells. A IE structure, such as a PUCCH-TPC-Command-Config IE structure associated with the group-common DCI 806 may be extended to include secondary cells which may be enabled with PUCCH carrier switch. The IE structure may be configured via RRC by the base station 804. For example, FIG. 9 is a diagram 900 illustrating example group-common DCI 806. As illustrated in FIG. 9, the group-common DCI may indicate one or more blocks such as a first block 902, a second block 904, a third block 906, a fourth block 908, a fifth block 910, and additional blocks such as block N 912. Each of the second block 904, third block 906, fourth block 908, and fifth block 910 may be associated with a TPC, such as a first TPC 952, a second TPC 954, a third TPC 956, a fourth TPC 958, or the like. By way of example, the first TPC 952 may be a TPC associated with a primary cell index, the second TPC 954 may be associated with a PUCCH secondary cell index 1, the third TPC 956 may be associated with a first non-PUCCH secondary cell index, and the fourth TPC 958 may be associated with a second non-PUCCH secondary cell index. Each of the indexes may be configured via RRC. For the UE 802 to transmit a PUCCH, the UE 802 may receive, via RRC, an index representing a position to read TPC from the group-common DCI 806 (e.g., position=tpc-IndexPCell for Pcell, position tpc-IndexPUCCH-SCell for PUCCH-Scell, position tpc-IndexSCell-1 for Scell 1, or the like). The group-common DCI 806 may include multiple TPCs for multiple CCs for every UE in the group, including the UE 802 and the UE 803. After decoding the group-common DCI 806, the UE may follow its RRC configured positions to read TPCs for all CCs to transmit the PUCCH 810. The UE 802 may then check the PUCCH 810 is transmitted on which CC and apply the TPC of that CC accordingly.

Figure 10:
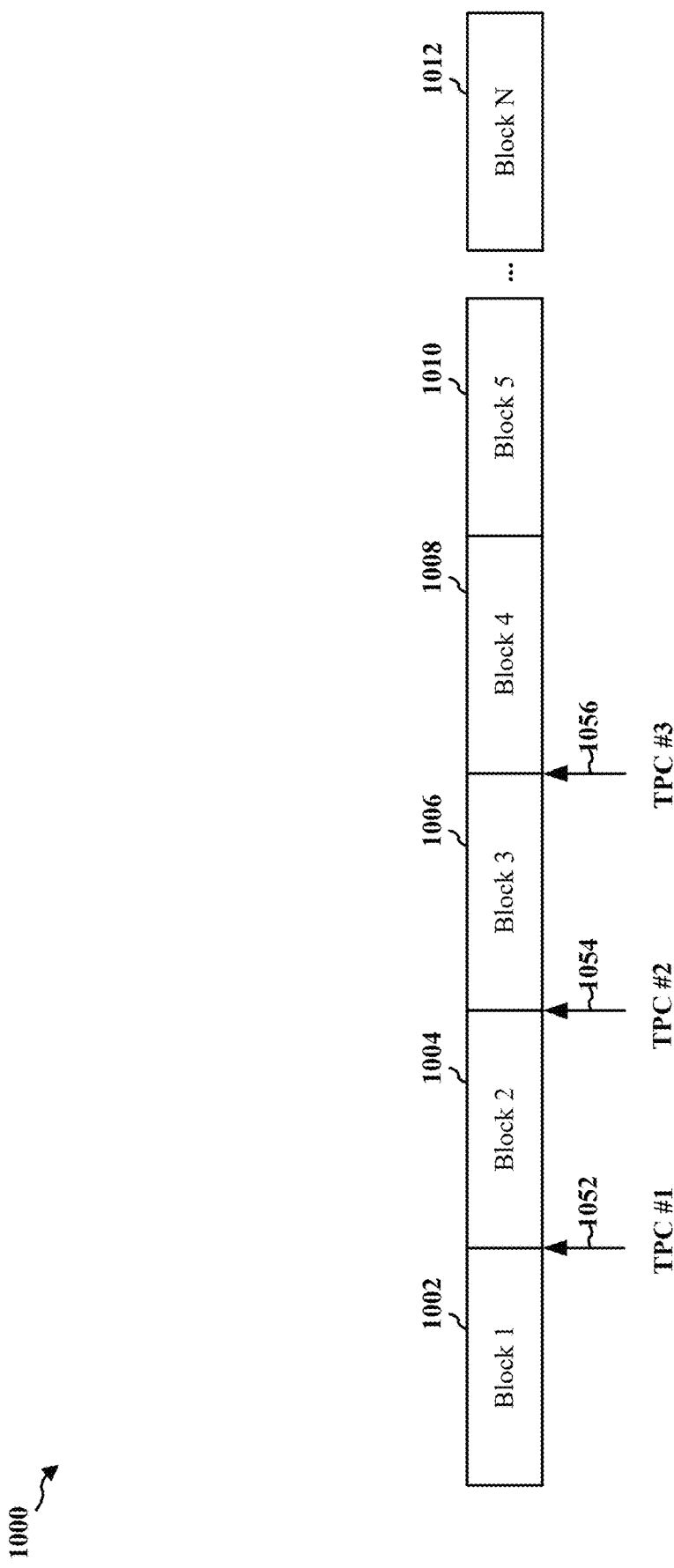
FIG. 10 is a diagram illustrating example DCI.

In some aspects, the group-common DCI 806 may be a DCI format 2_2 that indicates TPC for a single secondary cell. For example, the group-common DCI 806 may be associated with an IE for secondary cell TPC command config for group-common DCI 2_2, such as a PUCCH-Scell-TPC-CommandConfig IE. The IE may be configured via RRC. The PUCCH-Scell-TPC-CommandConfig may be per downlink cell or downlink bandwidth part (BWP). For a UE 802, the base station 804 may configure different PUCCH-Scell-TPC-CommandConfig per each downlink cell and may set a target cell to be different UL secondary cells. For example, on downlink cell 0, the target cell may be UL SCC-1, on downlink cell 1, the target cell may be UL SCC-2, or the like. For UEs that may send PUCCH on UL SCC-1, the base station group the UEs (which may include the UE 802) in a DCI 2_2, such as the group-common DCI 806, and may send the group-common DCI 806 on downlink cell 0. For UEs that may send PUCCH on UL SCC-2, which may include a second UE 803, the base station 804 may group them in another DCI 2_2, such as a group-common DCI 807 and send the group-common DCI 807 on DL cell 1. For example, FIG. 10 is a diagram 1000 illustrating example group-common DCI 806. As illustrated in FIG. 10, the group-common DCI may indicate one or more blocks such as a first block 1002, a second block 1004, a third block 1006, a fourth block 1008, a fifth block 1010, and additional blocks such as block N 1012. Each of the second block 1004, the third block 1006 and the fourth block 1008 may be associated with a TPC, such as the first TPC 1052, the second TPC 1054, the third TPC 1056, or the like. By way of example, the first TPC 1052 may be a TPC associated with a primary cell index, the second TPC 1054 may be associated with a PUCCH secondary cell index 1, and the third TPC 1056 may be associated with a non-PUCCH secondary cell index. The fourth block 1008 may be associated with a target cell indicated by the PUCCH-Scell-TPC-CommandConfig IE, so that a TPC associated with the fourth block 1008 may be indicated by the PUCCH-Scell-TPC-CommandConfig IE. By way of example, the first TPC 1052 may be a TPC associated with a primary cell index, the second TPC 1054 may be associated with a PUCCH secondary cell index 1, the third TPC 1056 may be associated with a non-PUCCH secondary cell index. Each of the indexes may be configured via RRC. For the UE 802, for each DL cell or BWP, the UE may receive RRC configuration configuring a position (e.g., tpc-Index-Scell) to read a TPC from the content of the group-common DCI 806. RRC may also configure a parameter (e.g., targetCell or servCellIndex) to indicate the TPC may apply to one or more cells to transmit PUCCH 810. For the UE 802, after decoding the group-common DCI 806, the UE 802 may determine the DCI is received on which DL cell/BWP, then read the RRC configured position and parameter for the DL cell/BWP. The UE 802 may follow the RRC configured position (e.g., based on the IE) to read the TPC, then apply the TPC to the target cell for transmission of PUCCH 810 based on the IE.

Figure 11:
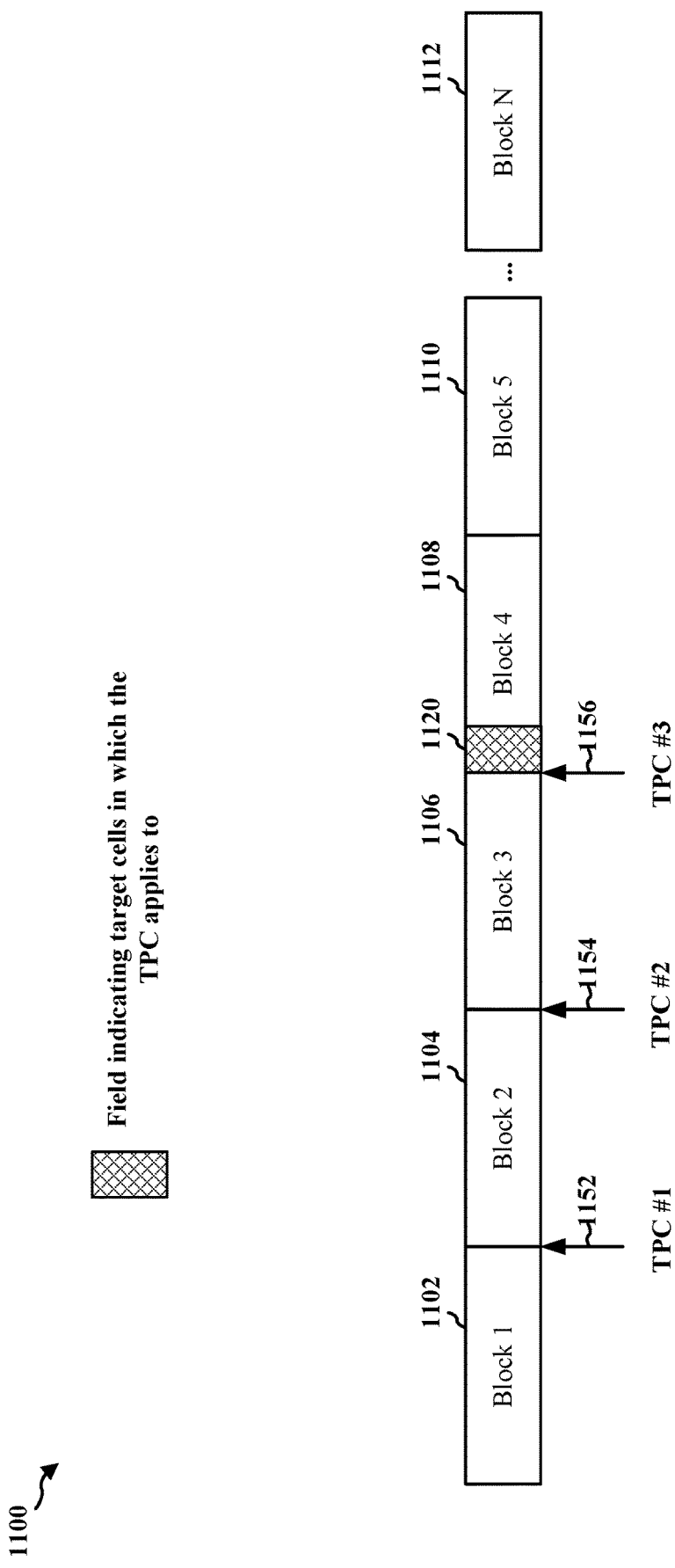
FIG. 11 is a diagram illustrating example DCI.

In some aspects, for a UE 802, the base station 804 may indicate a block in the DCI that may include a field representing to which target cell(s) a secondary cell TPC in the DCI may apply to. For example, FIG. 11 is a diagram 1100 illustrating example DCI. As illustrated in FIG. 11, the group-common DCI may indicate one or more blocks such as a firth block 1102, a second block 1104, a third block 1106, a fourth block 1108, a fifth block 1110, and additional blocks such as block N 1112. Each of the second block 1104, the third block 1106 and the fourth block 1108 may be associated with a TPC, such as a first TPC 1152, a second TPC 1154, a third TPC 1156, or the like. By way of example, the first TPC 1152 may be a TPC associated with a primary cell index, the second TPC 1154 may be associated with a PUCCH secondary cell index 1, and the third TPC 1156 may be associated with one non-PUCCH secondary cell index. In some aspects, for the UE 802, RRC may configure a position (e.g., represented by an index such as TPC-index-Scell) to read TPC from the content of the group-common DCI 806. For the UE 802, after decoding the group-common DCI 806, the UE 802 may follow the position represented by TPC-index-Scell to read the content bits in one block. The content bits may include a TPC and a field 1120 that indicates target cells that the TPC may apply when transmit the PUCCH 810.

Figure 12:
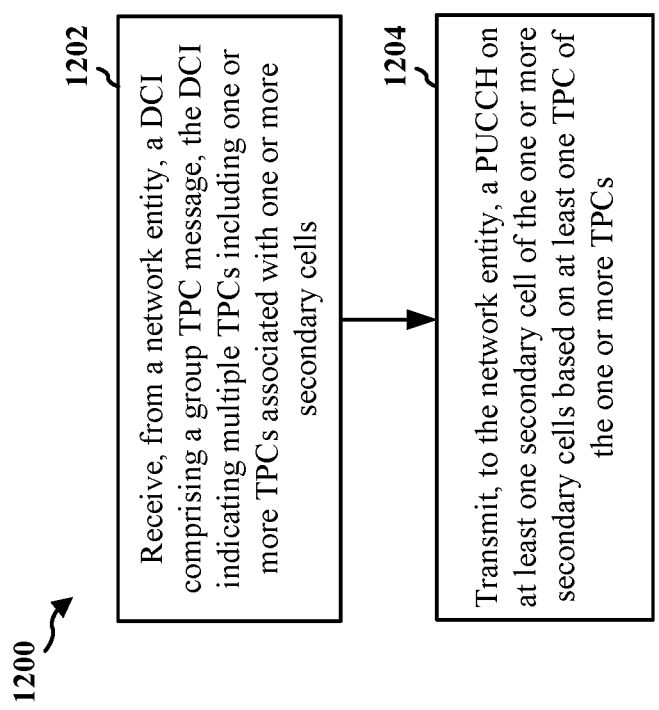
FIG. 12 is a flowchart of a method of wireless communication.

FIG. 12 is a flowchart 1200 of a method of communication. The method may be performed by a UE (e.g., the UE 104, the UE 802/803; the apparatus 1602). The method may be used to enable a DCI, such as a group-common DCI format 2_2, to indicate TPC for PUCCH transmission on secondary cells that may not be a PUCCH secondary cell. As a result, DCI based power control for PUCCH transmission with PUCCH carrier switch may be enabled, potentially saving energy for the UE.

At 1202, the UE may receive, from a network entity, a DCI comprising a group TPC message, the DCI indicating multiple TPCs including one or more TPCs associated with one or more secondary cells and a primary cell for the UE and one or more other UEs. For example, the UE 802 may receive, from a network entity (e.g., base station 804), a DCI 806 comprising a group TPC message, the DCI 806 indicating multiple TPCs including one or more TPCs associated with one or more secondary cells. In some aspects, 1202 may be performed by the TPC component 1642 of FIG. 16.

At 1203, the UE may identify a TPC to be applied to a target secondary cell or a target primary cell from the one or more TPCs. For example, the UE 802 may identify a TPC to be applied to a target secondary cell or a target primary cell from the one or more TPCs and then switch to that cell for PUCCH transmission. In some aspects, 1203 may be performed by the TPC component 1642 of FIG. 16.

At 1204, the UE may transmit, to the network entity, a PUCCH on the target secondary cell or the target primary cell based on the identified TPC from the one or more TPCs. For example, the UE 802 may transmit, to the network entity (e.g., base station 804), a PUCCH 810 on the target secondary cell or the target primary cell based on an identified TPC from the one or more TPCs. In some aspects, 1204 may be performed by the PUCCH component 1644 of FIG. 16.

Figure 13:
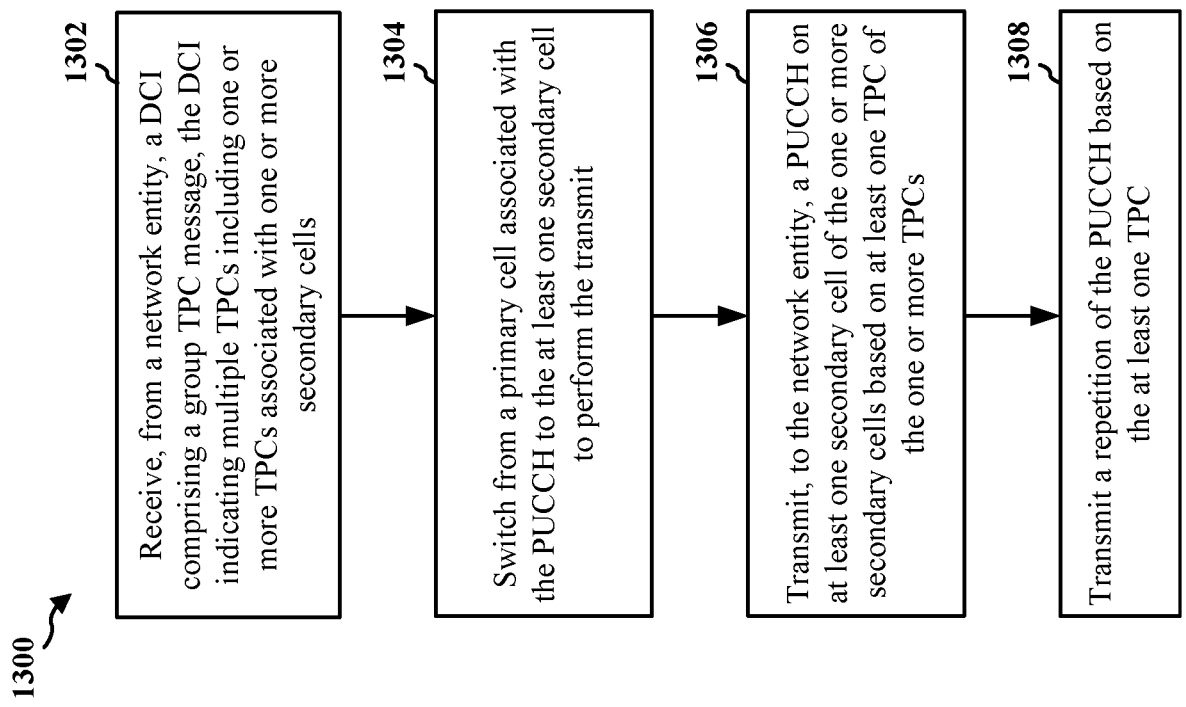
FIG. 13 is a flowchart of a method of wireless communication.

FIG. 13 is a flowchart 1300 of a method of communication. The method may be performed by a UE (e.g., the UE 104, the UE 802/803; the apparatus 1602). The method may be used to enable a DCI, such as a group-common DCI format 2_2, to indicate TPC for PUCCH transmission on secondary cells that may not be a PUCCH secondary cell. As a result, DCI based power control for PUCCH transmission with PUCCH carrier switch may be enabled, potentially saving energy for the UE.

At 1302, the UE may receive, from a network entity, a DCI comprising a group TPC message, the DCI indicating multiple TPCs including one or more TPCs associated with one or more secondary cells and a primary cell for the UE and one or more other UEs. For example, the UE 802 may receive, from a network entity (e.g., base station 804), a DCI 806 comprising a group TPC message, the DCI 806 indicating multiple TPCs including one or more TPCs associated with one or more secondary cells and a primary cell for the UE and one or more other UEs. In some aspects, 1302 may be performed by the TPC component 1642 of FIG. 16. In some aspects, the one or more secondary cells may include multiple secondary cells associated with a PUCCH carrier switch, and each TPC of the multiple TPCs may be associated with one secondary cell or a primary cell to transmit PUCCH based on an association. The association may be configured by RRC for each UE. In some aspects, a starting position associated with the each TPC of the multiple TPCs may be configured by the RRC. For example, as illustrated in FIG. 9, the DCI may include TPC 956 and TPC 958 associated with a first non-PUCCH secondary cell and a second non-PUCCH secondary cell. The association may be the previously described IE configured via RRC. In some aspects, the DCI may indicate a single TPC for a single secondary cell. For example, as illustrated in FIG. 10, the DCI indicates a TPC 1056 for a non-PUCCH secondary cell. In some aspects, the single TPC is associated with the single cell based on an association, the association may be configured by RRC. The RRC configuration is per downlink cell or downlink BWP. For example, the association may be a previously described IE configured by RRC.

In some aspects, the one or more TPCs is one TPC and the one or more secondary cells may include multiple secondary cells arranged in at least one block. In some aspects, each of the at least one block in the DCI may include a field to indicate the TPC in the block associated with one of the multiple secondary cells to transmit the PUCCH. For example, as illustrated in FIG. 11, the DCI may include a TPC configuration parameter corresponding to the field 1120 indicating the one or more blocks that the TPC 1156 may apply to.

In some aspects, the DCI is a group-common DCI transmitted to a group of UEs including the UE. In some aspects, the DCI further includes TPC associated with a PUSCH. In some aspects, the DCI may include a second TPC associated with a PUCCH secondary cell, the PUCCH secondary cell being different from the one or more secondary cells. For example, as illustrated in FIGS. 9-11, the DCI may include a TPC 954, a TPC 1054, or a TPC 1154 associated with a PUCCH secondary cell. In some aspects, the DCI may further include a TPC associated with a primary cell. For example, as illustrated in FIGS. 9-11, the DCI may include a TPC 952, a TPC 1052, or a TPC 1152 associated with a primary cell.

At 1303, the UE may identify a TPC to be applied to a target secondary cell or a target primary cell from the one or more TPCs. For example, the UE 802 may identify a TPC to be applied to a target secondary cell or a target primary cell from the one or more TPCs and then switch to that cell for PUCCH transmission. In some aspects, 1203 may be performed by the TPC component 1642 of FIG. 16.

In some aspects, at 1304, the UE may switch from a primary cell associated with the PUCCH to the target secondary cell to perform the transmit (e.g., of a PUCCH at 1306). For example, at 808, the UE 802 may switch from a primary cell associated with the PUCCH to the at least one secondary cell to transmit the PUCCH 810. In some aspects, 1304 may be performed by the PUCCH component 1644 of FIG. 16.

At 1306, the UE may transmit, to the network entity, a PUCCH on the target secondary cell or the target primary cell based on the identified TPC from the one or more TPCs. For example, the UE 802 may transmit, to the network entity (e.g., base station 804), a PUCCH 810 on the target secondary cell or the target primary cell based on an identified TPC from the one or more TPCs. In some aspects, 1306 may be performed by the PUCCH component 1644 of FIG. 16.

At 1308, the UE may transmit, to the network entity, a repetition of the PUCCH based on the at least one TPC. For example, the UE 802 may transmit, to the network entity (e.g., base station 804), a PUCCH 810N based on the at least one TPC. In some aspects, 1308 may be performed by the PUCCH component 1644 of FIG. 16.

Figure 14:
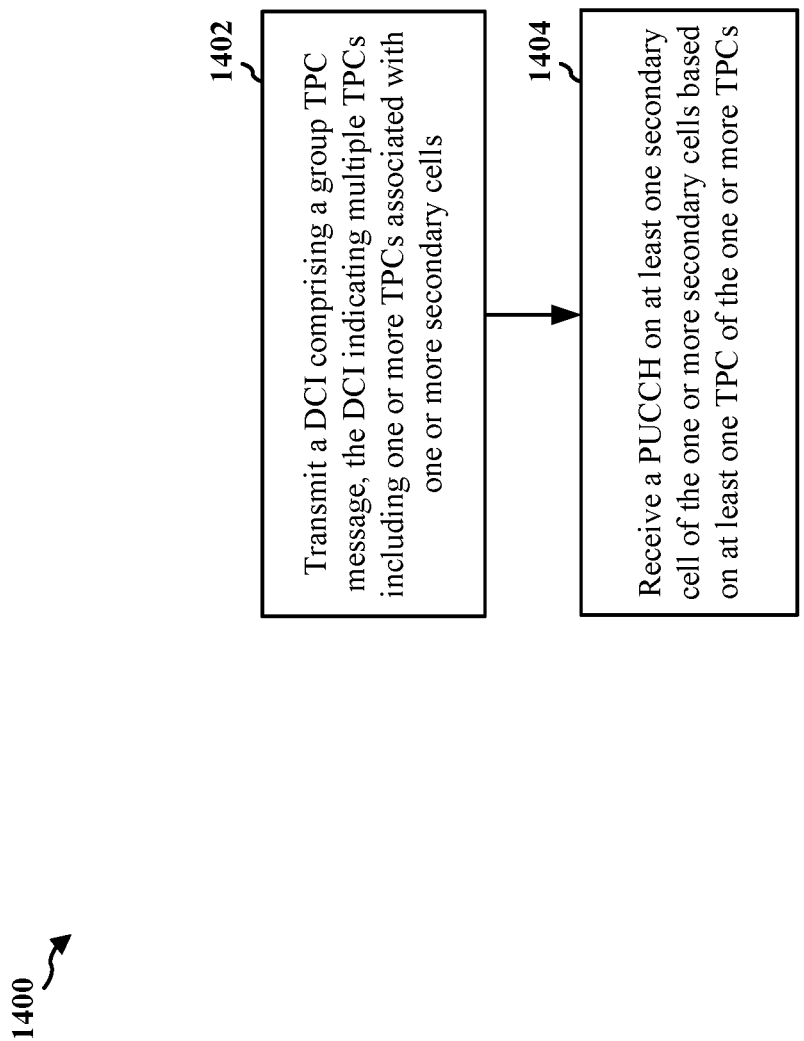
FIG. 14 is a flowchart of a method of wireless communication.

FIG. 14 is a flowchart 1400 of a method of communication. The method may be performed by a network entity (e.g., associated with the base station 180, the base station 804; the apparatus 1702). The method may be used to enable a DCI, such as a group-common DCI format 2_2, to indicate TPC for PUCCH transmission on secondary cells that may not be a PUCCH secondary cell. As a result, DCI based power control for PUCCH transmission with PUCCH carrier switch may be enabled, potentially saving energy for the UE.

At 1402, the network entity may transmit a DCI comprising a group TPC message, the DCI indicating multiple TPCs including one or more TPCs associated with one or more secondary cells and a primary cell for the UE and one or more other UEs. For example, the base station 804 may transmit, to a UE 802, a DCI 806 comprising a group TPC message, the DCI 806 indicating multiple TPCs including one or more TPCs associated with one or more secondary cells. In some aspects, 1402 may be performed by the TPC component 1742 of FIG. 17.

At 1404, the network entity may receive a PUCCH on the target secondary cell or the target primary cell based on an identified TPC from the one or more TPCs. For example, the base station 804 may receive a PUCCH 810 on the target secondary cell or the target primary cell based on an identified TPC from the one or more TPCs. In some aspects, 1404 may be performed by the PUCCH component 1744 of FIG. 17.

Figure 15:
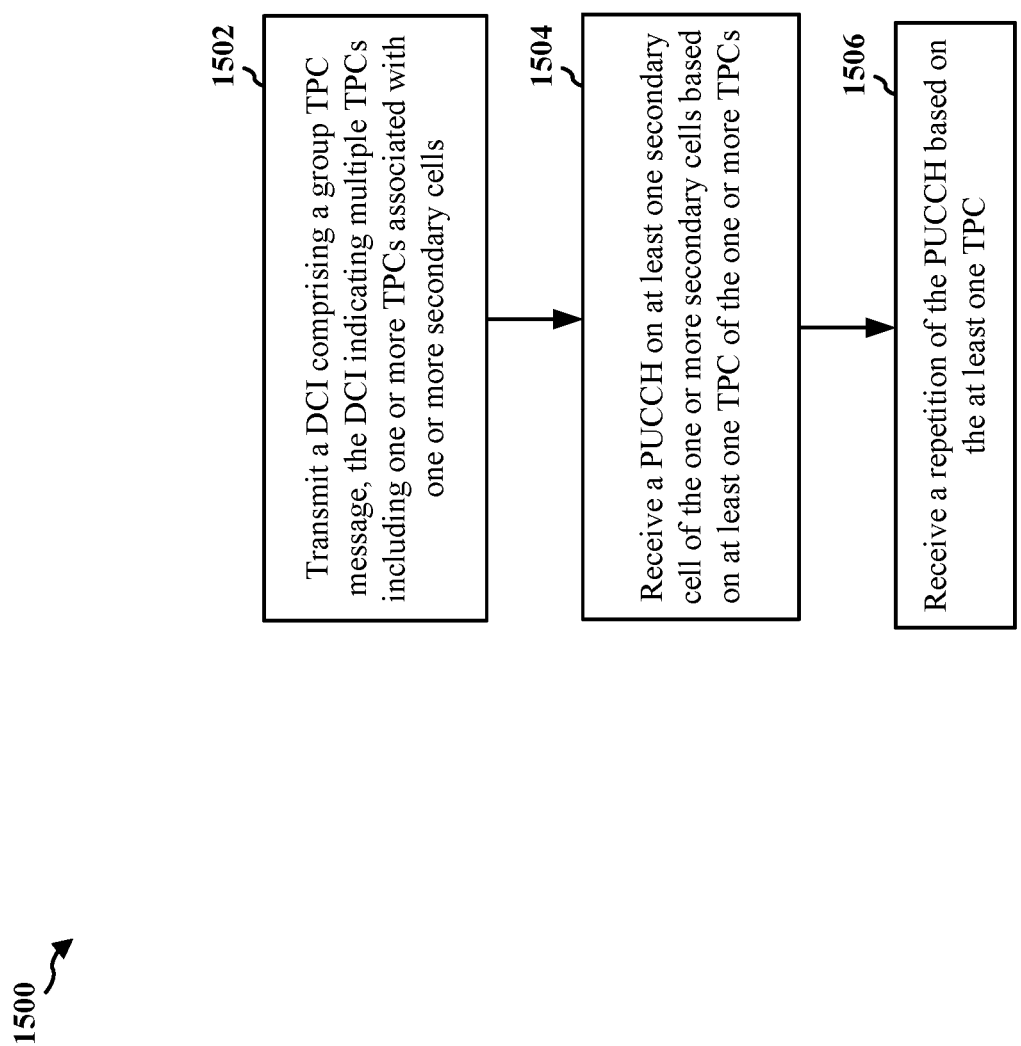
FIG. 15 is a flowchart of a method of wireless communication.

FIG. 15 is a flowchart 1500 of a method of communication. The method may be performed by a network entity (e.g., associated with the base station 180, the base station 804; the apparatus 1702). The method may be used to enable a DCI, such as a group-common DCI format 2_2, to indicate TPC for PUCCH transmission on secondary cells that may not be a PUCCH secondary cell. As a result, DCI based power control for PUCCH transmission with PUCCH carrier switch may be enabled, potentially saving energy for the UE.

At 1502, the network entity may transmit a DCI comprising a group TPC message, the DCI indicating multiple TPCs including one or more TPCs associated with one or more secondary cells and a primary cell for the UE and one or more other UEs. For example, the base station 804 may transmit, to a UE 802, a DCI 806 comprising a group TPC message, the DCI 806 indicating multiple TPCs including one or more TPCs associated with one or more secondary cells. In some aspects, 1502 may be performed by the TPC component 1742 of FIG. 17.

In some aspects, the one or more secondary cells may include multiple secondary cells associated with a PUCCH carrier switch, and the DCI may indicate a corresponding TPC of the one or more TPCs associated with each of the multiple secondary cells. For example, as illustrated in FIG. 9, the DCI may include TPC 956 and TPC 958 associated with a first non-PUCCH secondary cell and a second non-PUCCH secondary cell. In some aspects, the DCI may indicate a single TPC for a single secondary cell. For example, as illustrated in FIG. 10, the DCI indicates a TPC 1056 for a non-PUCCH secondary cell. In some aspects, the DCI may include a TPC configuration parameter representing the one TPC, and the TPC configuration parameter may be associated with a downlink cell or a BWP, the downlink cell or the BWP being associated with the one secondary cell.

In some aspects, the one or more TPCs is one TPC and the one or more secondary cells may include multiple secondary cells arranged in at least one block. In some aspects, one of the at least one block in the DCI may include a field to indicate the TPC associated with one of the multiple secondary cells to transmit the PUCCH. For example, as illustrated in FIG. 11, field 1120 may indicate the TPC 1156 associated with one of the multiple secondary cells to transmit the PUCCH.

In some aspects, the DCI is a group-common DCI transmitted to a group of UEs including the UE. In some aspects, the DCI further includes TPC associated with a PUSCH. In some aspects, the DCI may include a second TPC associated with a PUCCH secondary cell, the PUCCH secondary cell being different from the one or more secondary cells. For example, as illustrated in FIGS. 9-11, the DCI may include a TPC 954, a TPC 1054, or a TPC 1154 associated with a PUCCH secondary cell. In some aspects, the DCI may further include a TPC associated with a primary cell. For example, as illustrated in FIGS. 9-11, the DCI may include a TPC 952, a TPC 1052, or a TPC 1152 associated with a primary cell.

At 1504, the network entity may receive a PUCCH on the target secondary cell or the target primary cell based on an identified TPC from the one or more TPCs. For example, the base station 804 may receive a PUCCH 810 on the target secondary cell or the target primary cell based on an identified TPC from the one or more TPCs. In some aspects, 1504 may be performed by the PUCCH component 1744 of FIG. 17.

At 1506, the network entity may receive a repetition of the PUCCH based on the at least one TPC. For example, the base station 804 may receive a PUCCH 810N based on the at least one TPC. In some aspects, 1506 may be performed by the PUCCH component 1744 of FIG. 17.

Figure 16:
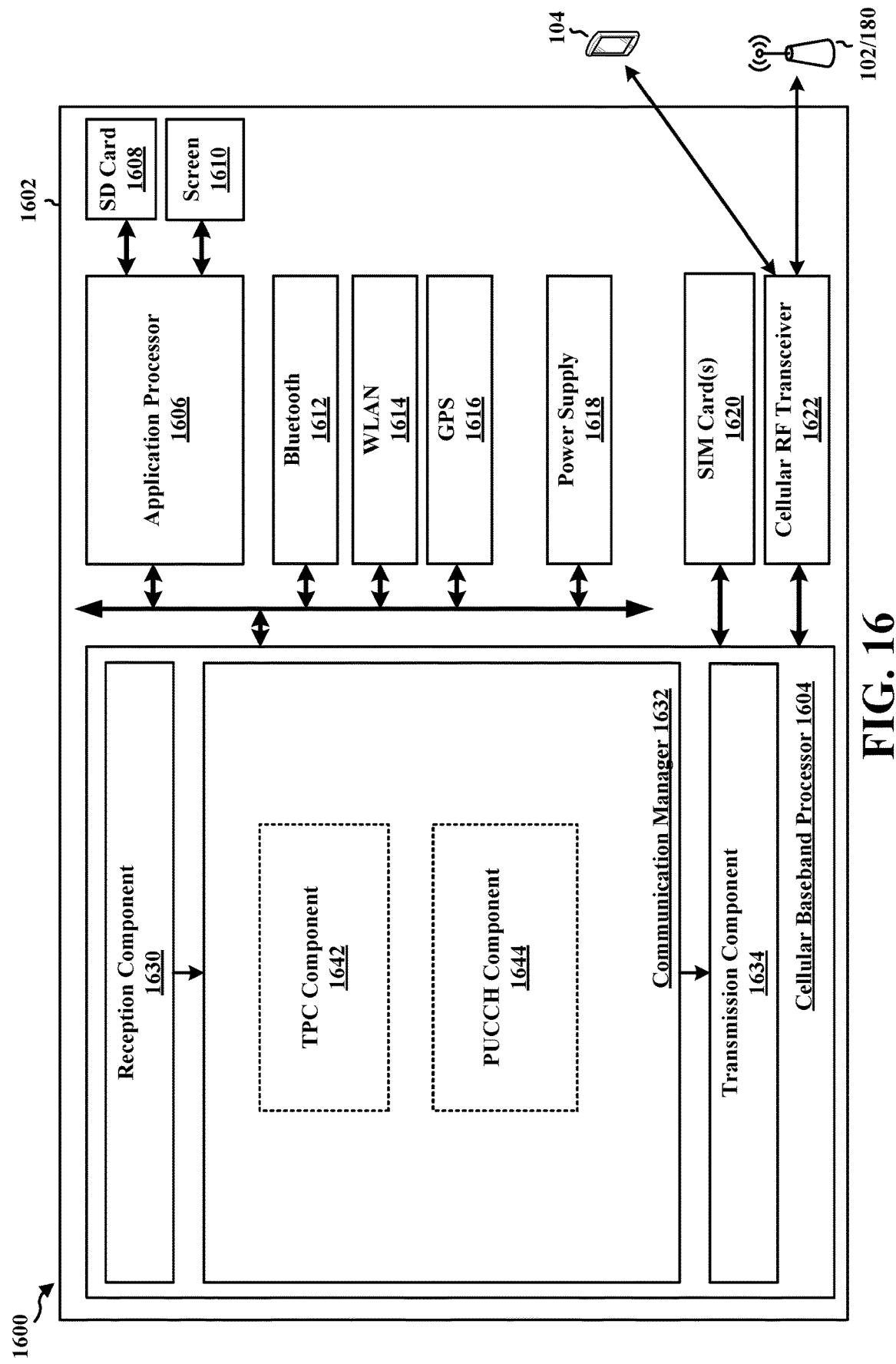
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 may include a TPC component 1642 that is configured to receive, from a network entity, a DCI comprising a group TPC message, the DCI indicating multiple TPCs including one or more TPCs associated with one or more secondary cells and a primary cell for the UE and one or more other UEs and identify a TPC to be applied to a target secondary cell or a target primary cell from the one or more TPCs, e.g., as described in connection with 1202/1203 in FIGS. 12 and 1302/1303 in FIG. 13. The communication manager 1632 may further include a PUCCH component 1644 that may be configured to switch from a primary cell associated with the PUCCH to the at least one secondary cell to perform the transmit, transmit, to the network entity, a PUCCH on the target secondary cell or the target primary cell based on an identified TPC from the one or more TPCs, or transmit a repetition of the PUCCH based on the at least one TPC, e.g., as described in connection with 1204 in FIGS. 12 and 1304, 1306, or 1308 in FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, may include means for receiving, from a network entity, a DCI comprising a group TPC message, the DCI indicating multiple TPCs including one or more TPCs associated with one or more secondary cells and a primary cell for the UE and one or more other UEs. The cellular baseband processor 1604 may further include means for identifying a TPC to be applied to a target secondary cell or a target primary cell from the one or more TPCs. The cellular baseband processor 1604 may further include means for transmitting, to the base station, a PUCCH on the target secondary cell or the target primary cell based on an identified TPC from the one or more TPCs. The cellular baseband processor 1604 may further include means for switching from a primary cell associated with the PUCCH to the at least one secondary cell to perform the transmit. The cellular baseband processor 1604 may further include means for transmitting a repetition of the PUCCH based on the at least one TPC. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
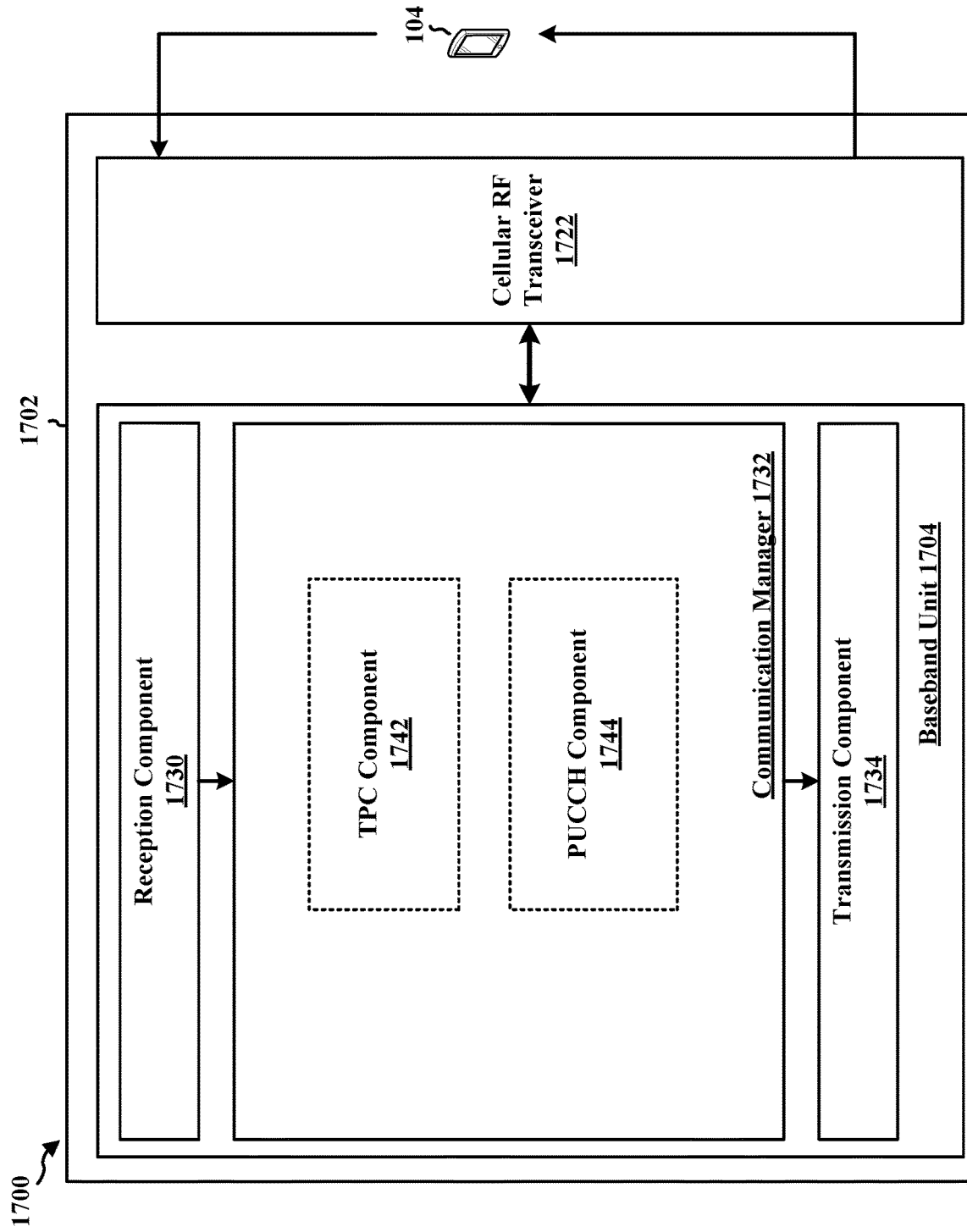
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1602 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 may include a TPC component 1742 that may transmit a DCI comprising a group TPC message, the DCI indicating multiple TPCs including one or more TPCs associated with one or more secondary cells and a primary cell for the UE and one or more other UEs, e.g., as described in connection with 1402 in FIG. 14 or 1502 in FIG. 15. The communication manager 1732 further may include a PUCCH component 1744 that may receive a PUCCH on the target secondary cell or the target primary cell based on an identified TPC from the one or more TPCs or receive a repetition of the PUCCH based on the at least one TPC, e.g., as described in connection with 1404 in FIG. 14 or 1504 and 1506 in FIG. 15.

The apparatus may include additional components that perform each of the blocks of the algorithm in the flowcharts of FIGS. 14 and 15. As such, each block in the flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, may include means for transmitting a DCI comprising a group TPC message, the DCI indicating multiple TPCs including one or more TPCs associated with one or more secondary cells and a primary cell for the UE and one or more other UEs. The baseband unit 1704 may further include means for receiving a PUCCH on the target secondary cell or the target primary cell based on an identified TPC from the one or more TPCs. The baseband unit 1704 may further include means for receiving a repetition of the PUCCH based on the at least one TPC. The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 18:
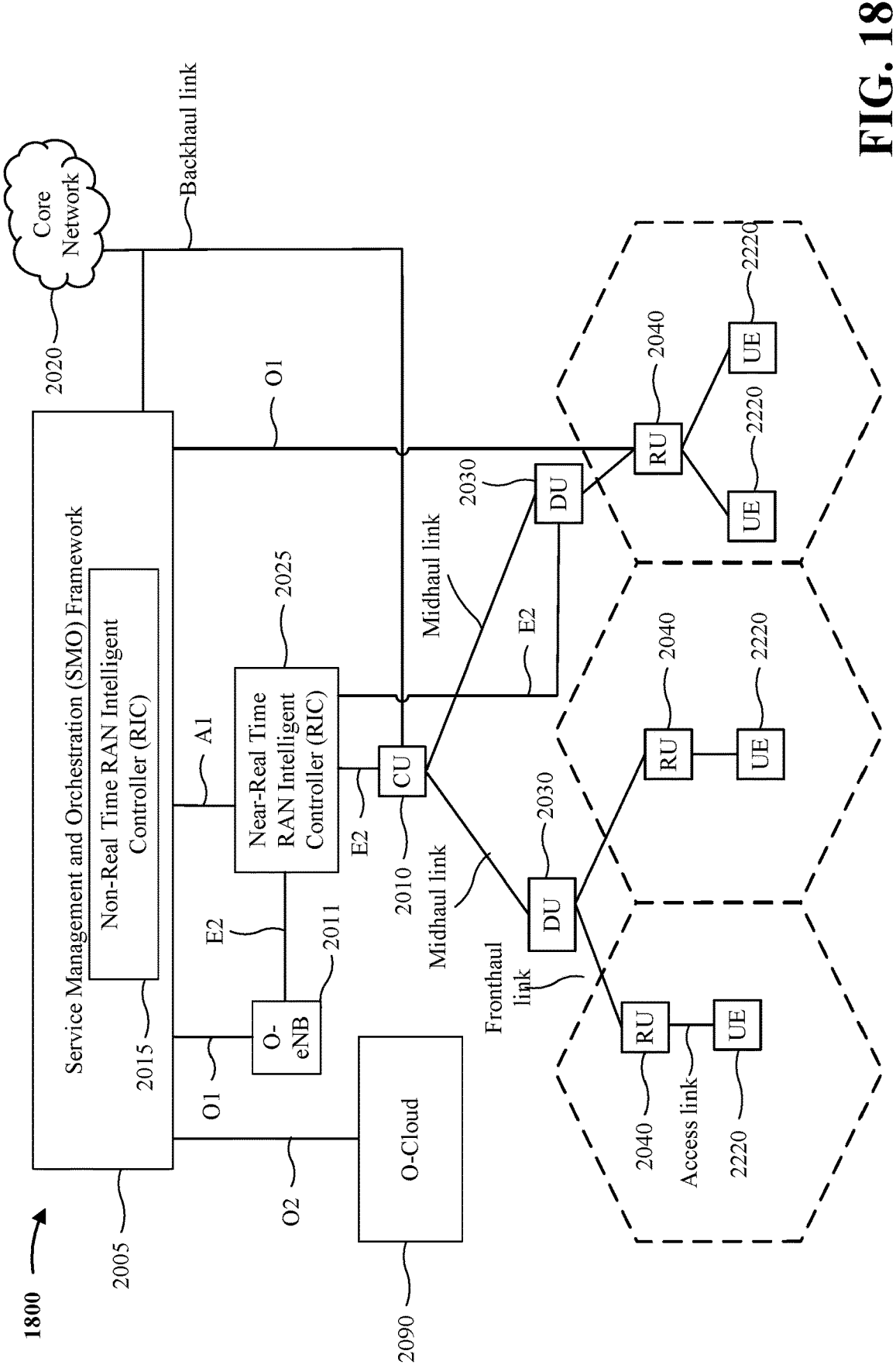
FIG. 18 shows a diagram illustrating an example disaggregated base station architecture.

FIG. 18 shows a diagram illustrating an example disaggregated base station 1800 architecture. The disaggregated base station 1800 architecture may include one or more central units (CUs) 2010 that can communicate directly with a core network 2020 via a backhaul link, or indirectly with the core network 2020 through one or more disaggregated base station units (such as a Near-Real Time (Near-RT) RAN Intelligent Controller (RIC) 2025 via an E2 link, or a Non-Real Time (Non-RT) RIC 2015 associated with a Service Management and Orchestration (SMO) Framework 2005, or both). A CU 2010 may communicate with one or more distributed units (DUs) 2030 via respective midhaul links, such as an F1 interface. The DUs 2030 may communicate with one or more radio units (RUs) 2040 via respective fronthaul links. The RUs 2040 may communicate with respective UEs 2220 via one or more radio frequency (RF) access links. In some implementations, the UE 2220 may be simultaneously served by multiple RUs 2040.

Each of the units, i.e., the CUs 2010, the DUs 2030, the RUs 2040, as well as the Near-RT RICs 2025, the Non-RT RICs 2015 and the SMO Framework 2005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2010. The CU 2010 may be configured to handle user plane functionality (i.e., Central Unit-User Plane (CU-UP)), control plane functionality (i.e., Central Unit-Control Plane (CU-CP)), or a combination thereof. In some implementations, the CU 2010 can be logically split into one or more CU-UP units and one or more CU-CP units. The CU-UP unit can communicate bidirectionally with the CU-CP unit via an interface, such as the E1 interface when implemented in an O-RAN configuration. The CU 2010 can be implemented to communicate with the DU 2030, as necessary, for network control and signaling.

The DU 2030 may correspond to a logical unit that includes one or more base station functions to control the operation of one or more RUs 2040. In some aspects, the DU 2030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 2030 may further host one or more low PHY layers. Each layer (or module) can be implemented with an interface configured to communicate signals with other layers (and modules) hosted by the DU 2030, or with the control functions hosted by the CU 2010.

Lower-layer functionality can be implemented by one or more RUs 2040. In some deployments, an RU 2040, controlled by a DU 2030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2040 can be implemented to handle over the air (OTA) communication with one or more UEs 2220. In some implementations, real-time and non-real-time aspects of control and user plane communication with the RU(s) 2040 can be controlled by the corresponding DU 2030. In some scenarios, this configuration can enable the DU(s) 2030 and the CU 2010 to be implemented in a cloud-based RAN architecture, such as a vRAN architecture.

The SMO Framework 2005 may be configured to support RAN deployment and provisioning of non-virtualized and virtualized network elements. For non-virtualized network elements, the SMO Framework 2005 may be configured to support the deployment of dedicated physical resources for RAN coverage requirements which may be managed via an operations and maintenance interface (such as an O1 interface). For virtualized network elements, the SMO Framework 2005 may be configured to interact with a cloud computing platform (such as an open cloud (O-Cloud) 2090) to perform network element life cycle management (such as to instantiate virtualized network elements) via a cloud computing platform interface (such as an O2 interface). Such virtualized network elements can include, but are not limited to, CUs 2010, DUs 2030, RUs 2040 and Near-RT RICs 2025. In some implementations, the SMO Framework 2005 can communicate with a hardware aspect of a 4G RAN, such as an open eNB (O-eNB) 2011, via an O1 interface. Additionally, in some implementations, the SMO Framework 2005 can communicate directly with one or more RUs 2040 via an O1 interface. The SMO Framework 2005 also may include a Non-RT RIC 2015 configured to support functionality of the SMO Framework 2005.

The Non-RT RIC 2015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2025. The Non-RT RIC 2015 may be coupled to or communicate with (such as via an A1 interface) the Near-RT RIC 2025. The Near-RT RIC 2025 may be configured to include a logical function that enables near-real-time control and optimization of RAN elements and resources via data collection and actions over an interface (such as via an E2 interface) connecting one or more CUs 2010, one or more DUs 2030, or both, as well as an O-eNB, with the Near-RT RIC 2025.

In some implementations, to generate AI/ML models to be deployed in the Near-RT RIC 2025, the Non-RT RIC 2015 may receive parameters or external enrichment information from external servers. Such information may be utilized by the Near-RT RIC 2025 and may be received at the SMO Framework 2005 or the Non-RT RIC 2015 from non-network data sources or from network functions. In some examples, the Non-RT RIC 2015 or the Near-RT RIC 2025 may be configured to tune RAN behavior or performance. For example, the Non-RT RIC 2015 may monitor long-term trends and patterns for performance and employ AI/ML models to perform corrective actions through the SMO Framework 2005 (such as reconfiguration via O1) or via creation of RAN management policies (such as A1 policies).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for communication at a user equipment (UE), comprising: receiving, from a network entity, a downlink control information (DCI) comprising a group transmission power control (TPC) message, the DCI indicating multiple TPCs including one or more TPCs associated with one or more secondary cells and a primary cell for the UE and one or more other UEs; identifying a TPC to be applied to a target secondary cell or a target primary cell from the one or more TPCs; and transmitting, to the base station, a physical uplink control channel (PUCCH) on the target secondary cell or the target primary cell based on the identified TPC from the one or more TPCs.

Aspect 2 is the method of aspect 1, wherein the one or more secondary cells comprises multiple secondary cells associated with a PUCCH carrier switch, and wherein each TPC of the multiple TPCs is associated with one secondary cell or the primary cell to transmit the PUCCH based on an association, the association being configured by radio resource control (RRC) for each UE.

Aspect 3 is the method of any of aspect 1-2, wherein a starting position associated with each TPC of the multiple TPCs is configured by the RRC.

Aspect 4 is the method of aspect 1, wherein the DCI indicates a single TPC for a single cell.

Aspect 5 is the method of aspect 3, wherein the single TPC is associated with the single cell based on an association, the association being configured by radio resource control (RRC), wherein the RRC configuration is per downlink cell or downlink bandwidth part (BWP).

Aspect 6 is the method of any of aspects 1-5, wherein the one or more TPCs is one TPC and the one or more secondary cells comprises multiple secondary cells arranged in at least one block, wherein one of the at least one block in the DCI comprises a field to indicate the TPC associated with one of the multiple secondary cells to transmit the PUCCH.

Aspect 7 is the method of any of aspects 1-6, further comprising: switch from the primary cell associated with the PUCCH to the target secondary cell to transmit the PUCCH.

Aspect 8 is the method of any of aspects 1-7, wherein the DCI is a group-common DCI transmitted to a group of UEs including the UE.

Aspect 9 is the method of any of aspects 1-8, wherein the DCI further comprises at least one TPC associated with a physical uplink shared channel (PUSCH).

Aspect 10 is the method of any of aspects 1-9, further comprising: transmitting a repetition of the PUCCH based on the at least one TPC.

Aspect 11 is the method of any of aspects 1-10, wherein the DCI comprises a second TPC associated with a PUCCH secondary cell, the PUCCH secondary cell being different from the one or more secondary cells.

Aspect 12 is the method of any of aspects 1-11, wherein the method is performed at a UE comprising a transceiver coupled to the at least one processor.

Aspect 13 is a method for communication at a network entity such as a base station, comprising: transmitting a downlink control information (DCI) comprising a group transmission power control (TPC) message, the DCI indicating multiple TPCs including one or more TPCs associated with one or more secondary cells and a primary cell for the UE and one or more other UEs; and receiving a physical uplink control channel (PUCCH) on a target secondary cell or a target primary cell based on an identified TPC from the one or more TPCs.

Aspect 14 is the method of aspect 13, wherein the one or more secondary cells comprises multiple secondary cells associated with a PUCCH carrier switch, and wherein each TPC of the multiple TPCs is associated with one secondary cell or the primary cell to transmit the PUCCH based on an association, the association being configured by radio resource control (RRC) for each UE.

Aspect 15 is the method of any of aspects 13-14, wherein a starting position associated with each TPC of the multiple TPCs is configured by the RRC.

Aspect 16 is the method of aspect 13, wherein the DCI indicates a single TPC for a single cell.

Aspect 17 is the method of aspect 16, wherein the single TPC is associated with the single cell based on an association, the association being configured by radio resource control (RRC), wherein the RRC configuration is per downlink cell or downlink bandwidth part (BWP).

Aspect 18 is the method of any of aspects 13-17, wherein the one or more TPCs is one TPC and the one or more secondary cells comprises multiple secondary cells arranged in at least one block, wherein one of the at least one block in the DCI comprises a field to indicate the TPC associated with one of the multiple secondary cells to transmit the PUCCH.

Aspect 19 is the method of any of aspects 13-18, wherein the DCI is a group-common DCI transmitted to a group of UEs including the UE.

Aspect 20 is the method of any of aspects 13-19, wherein the DCI further comprises at least one TPC associated with a physical uplink shared channel (PUSCH).

Aspect 21 is the method of any of aspects 13-20, further comprising: receiving a repetition of the PUCCH based on the at least one TPC.

Aspect 22 is the method of any of aspects 13-21, wherein the DCI comprises a second TPC associated with a PUCCH secondary cell, the PUCCH secondary cell being different from the one or more secondary cells.

Aspect 23 is the method of any of aspects 13-22, wherein the method is performed at a UE comprising a transceiver coupled to the at least one processor.

Aspect 24 is an apparatus for communication at a UE comprising a memory comprising instructions and at least one processor coupled to the memory and configured to execute the instructions and cause the apparatus to perform a method in accordance with any one of Aspects 1-12.

Aspect 25 is an apparatus for communication at a network entity comprising a memory comprising instructions and at least one processor coupled to the memory and configured to execute the instructions and cause the apparatus to perform a method in accordance with any one of Aspects 13-23.

Aspect 26: An apparatus for communications, comprising means for performing a method in accordance with any one of Aspects 1-12.

Aspect 27: An apparatus for communications, comprising means for performing a method in accordance with any one of Aspects 13-23.

Aspect 28: A non-transitory computer-readable medium comprising instructions that, when executed by an apparatus, cause the apparatus to perform a method in accordance with any one of Aspects 1-12.

Aspect 29: A non-transitory computer-readable medium comprising instructions that, when executed by an apparatus, cause the apparatus to perform a method in accordance with any one of Aspects 13-23.

What is claimed is:

1. An apparatus for communication at a user equipment (UE), comprising:
   memory; and
   at least one processor coupled to the memory and configured to:
      receive, from a network entity, a downlink control information (DCI) comprising a group transmission power control (TPC) message, the DCI indicating multiple TPCs including one or more TPCs associated with one or more secondary cells and a primary cell for the UE and one or more other UEs, wherein the one or more secondary cells comprises multiple secondary cells arranged in multiple blocks, wherein one of the multiple blocks in the DCI comprises a field to indicate one TPC of the one or more TPCs as being associated with one of the multiple secondary cells, wherein the DCI is a format 2_2 DCI that includes a set of appended zeros based on a payload size associated with a format 1_0 DCI, and wherein the format 2_2 DCI that comprises the group TPC message is based on a per bandwidth part (BWP) configuration;
identify a TPC, from the multiple TPCs, as to be applied to a target secondary cell of the multiple secondary cells or a target primary cell from the one or more TPCs; and
transmit, to the network entity, a physical uplink control channel (PUCCH) on the target secondary cell or the target primary cell based on the identified TPC from the one or more TPCs.

2. The apparatus of claim 1, wherein the multiple secondary cells are associated with a PUCCH carrier switch, and wherein each TPC of the multiple TPCs is associated with one secondary cell or the primary cell to transmit the PUCCH.

3. The apparatus of claim 2, wherein a starting position associated with each TPC of the multiple TPCs is configured by radio resource control (RRC).

4. The apparatus of claim 1, wherein the DCI further indicates a single TPC for a single cell.

5. The apparatus of claim 4, wherein the single TPC is associated with the single cell based on an association, the association being configured by a radio resource control (RRC) configuration, wherein the RRC configuration is per downlink BWP.

6. The apparatus of claim 1, wherein the at least one processor is further configured to:
switch from the primary cell associated with the PUCCH to the target secondary cell to transmit the PUCCH.

7. The apparatus of claim 1, wherein the DCI is a group-common DCI transmitted to a group of UEs including the UE.

8. The apparatus of claim 1, wherein the DCI further comprises at least one TPC associated with a physical uplink shared channel (PUSCH).

9. The apparatus of claim 1, wherein the at least one processor is further configured to:
transmit a repetition of the PUCCH based on at least one TPC, wherein use of the at least one TPC for the repetition of the PUCCH is based on PUCCH repetitions on different cells having separate power control loops.

10. The apparatus of claim 1, wherein the DCI comprises a second TPC associated with a PUCCH secondary cell, and wherein the PUCCH secondary cell is different from the one or more secondary cells.

11. The apparatus of claim 1, further comprising a transceiver coupled to the at least one processor.

12. An apparatus for communication at a network entity, comprising:
memory; and
at least one processor coupled to the memory and configured to:
transmit a downlink control information (DCI) comprising a group transmission power control (TPC) message, the DCI indicating multiple TPCs including one or more TPCs associated with one or more secondary cells and a primary cell for a user equipment (UE) and one or more other UEs, wherein the one or more secondary cells comprises multiple secondary cells arranged in multiple blocks, wherein one of the multiple blocks in the DCI comprises a field to indicate one TPC of the one or more TPCs as being associated with one of the multiple secondary cells wherein the DCI is a format 2_2 DCI that includes a set of appended zeros based on a payload size associated with a format 1_0 DCI, and wherein the format 2_2 DCI that comprises the group TPC message is based on a per bandwidth part (BWP) configuration; and
receive a physical uplink control channel (PUCCH) on a target secondary cell of the multiple secondary cells or a target primary cell based on the one TPC from the one or more TPCs.

13. The apparatus of claim 12, wherein the multiple secondary cells are associated with a PUCCH carrier switch, and wherein each TPC of the multiple TPCs is associated with one secondary cell or the primary cell to transmit the PUCCH.

14. The apparatus of claim 13, wherein a starting position associated with each TPC of the multiple TPCs is configured by radio resource control (RRC).

15. The apparatus of claim 12, wherein the DCI further indicates a single TPC for a single cell.

16. The apparatus of claim 15, wherein the single TPC is associated with the single cell based on an association, the association being configured by a radio resource control (RRC) configuration, wherein the RRC configuration is per downlink BWP.

17. The apparatus of claim 12, wherein the DCI is a group-common DCI transmitted to a group of UEs including the UE.

18. The apparatus of claim 12, wherein the DCI further comprises at least one TPC associated with a physical uplink shared channel (PUSCH).

19. The apparatus of claim 12, wherein the at least one processor is further configured to:
receive a repetition of the PUCCH based on at least one TPC, wherein use of the at least one TPC for the repetition of the PUCCH is based on PUCCH repetitions on different cells having separate power control loops.

20. The apparatus of claim 12, wherein the DCI comprises a second TPC associated with a PUCCH secondary cell, and wherein the PUCCH secondary cell is different from the one or more secondary cells.

21. The apparatus of claim 12, further comprising a transceiver coupled to the at least one processor.

22. A method of communication at a user equipment (UE), comprising:
receiving, from a network entity, a downlink control information (DCI) comprising a group transmission power control (TPC) message, the DCI indicating multiple TPCs including one or more TPCs associated with one or more secondary cells and a primary cell for the UE and one or more other UEs, wherein the one or more secondary cells comprises multiple secondary cells arranged in multiple blocks, wherein one of the multiple blocks in the DCI comprises a field to indicate one TPC of the one or more TPCs as being associated with one of the multiple secondary cells, wherein the DCI is a format 2_2 DCI that includes a set of appended zeros based on a payload size associated with a format 1_0 DCI, and wherein the format 2_2 DCI that comprises the group TPC message is based on a per bandwidth part (BWP) configuration;
identifying a TPC, from the multiple TPCs, as to be applied to a target secondary cell of the multiple secondary cells or a target primary cell from the one or more TPCs; and transmitting, to the network entity, a physical uplink control channel (PUCCH) on the target secondary cell or the target primary cell based on the identified TPC from the one or more TPCs.

23. A method of communication at a network entity, comprising:

transmitting a downlink control information (DCI) comprising a group transmission power control (TPC) message, the DCI indicating multiple TPCs including one or more TPCs associated with one or more secondary cells and a primary cell for a user equipment (UE) and one or more other UEs, wherein the one or more secondary cells comprises multiple secondary cells arranged in multiple blocks, wherein one of the multiple blocks in the DCI comprises a field to indicate one TPC of the one or more TPCs as being associated with one of the multiple secondary cells, wherein the DCI is a format 2_2 DCI that includes a set of appended zeros based on a payload size associated with a format 1_0 DCI, and wherein the format 2_2 DCI that comprises the group TPC message is based on a per bandwidth part (BWP) configuration; and receiving a physical uplink control channel (PUCCH) on a target secondary cell of the multiple secondary cells or a target primary cell based on the one TPC from the one or more TPCs.

* * * * *